(12) United States Patent
Wylezinski et al.

(10) Patent No.: US 8,424,958 B2
(45) Date of Patent: Apr. 23, 2013

(54) BUTT JOINT FOR TRAILER SIDE WALL

(75) Inventors: Andrzej Wylezinski, Lafayette, IN (US); Melvin R. Norris, West Lafayette, IN (US); Leonard W. Baker, Lafayette, IN (US)

(73) Assignee: Wabash National, L.P.

( * ) Notice: Subject to any disclaimer, the term of this patent is extended or adjusted under 35 U.S.C. 154(b) by 665 days.

(21) Appl. No.: 12/573,229

(22) Filed: Oct. 5, 2009

(65) Prior Publication Data

US 2010/0078964 A1    Apr. 1, 2010

Related U.S. Application Data

(63) Continuation-in-part of application No. 11/972,730, filed on Jan. 11, 2008, now Pat. No. 7,677,642.

(60) Provisional application No. 60/884,825, filed on Jan. 12, 2007.

(51) Int. Cl.
 *B62D 25/02* (2006.01)
(52) U.S. Cl.
 USPC ............ 296/186.1; 296/191; 296/29; 52/417; 52/780; 29/525.01
(58) Field of Classification Search ............ 296/191, 296/30, 29, 186.1, 203; 52/417, 468, 469, 52/584.1, 717, 717.05; 29/525.01
See application file for complete search history.

(56) References Cited

U.S. PATENT DOCUMENTS

| | | | |
|---|---|---|---|
| 2,172,571 A | 9/1939 | Theriault |
| 2,322,088 A | 6/1943 | Black |
| 2,384,965 A | 9/1945 | Reid |
| 4,015,876 A | 4/1977 | Hulverson et al. |
| 4,212,405 A | 7/1980 | Schmidt |
| 4,357,047 A | 11/1982 | Katz |
| 4,455,807 A | 6/1984 | Ehrlich |
| 4,685,721 A | 8/1987 | Banerjea |
| 4,703,948 A | 11/1987 | Ehrlich |
| 4,940,279 A | 7/1990 | Abott et al. |
| 4,958,472 A | 9/1990 | Ehrlich |
| 5,066,066 A | 11/1991 | Yurgevich et al. |
| 5,112,099 A | 5/1992 | Yurgevich et al. |
| 5,286,079 A | 2/1994 | Zubko et al. |
| 5,439,266 A | 8/1995 | Ehrlich |
| 5,509,714 A | 4/1996 | Schmidt |
| 5,787,816 A | 8/1998 | Dworakowski et al. |
| 5,860,693 A | 1/1999 | Ehrlich |
| 5,876,089 A | 3/1999 | Ehrlich |

(Continued)

FOREIGN PATENT DOCUMENTS

| WO | 8300467 | 2/1983 |
| WO | 9810974 | 3/1998 |

OTHER PUBLICATIONS

Office Action dated May 6, 2009 for related U.S. Appl. No. 11/972,730 (8 pages).

(Continued)

*Primary Examiner* — Glenn Dayoan
*Assistant Examiner* — Pinel Romain

(57) ABSTRACT

A butt joint assembles side panels of a trailer to the base rail of the trailer to form a side wall. The butt joint positions the side panels over the base rail and vertically aligns the outer surfaces of the side panels and the base rail, which provides for an improved trailer side wall.

18 Claims, 18 Drawing Sheets

U.S. PATENT DOCUMENTS

| | | |
|---|---|---|
| 5,992,117 A | 11/1999 | Schmidt |
| 5,997,076 A | 12/1999 | Ehrlich |
| 6,003,932 A | 12/1999 | Banerjea et al. |
| 6,220,651 B1 | 4/2001 | Ehrlich |
| 6,412,854 B2 | 7/2002 | Ehrlich |
| 6,450,564 B1 | 9/2002 | Sill |
| 6,527,335 B1 | 3/2003 | Yurgevich |
| 6,578,902 B2 | 6/2003 | Sill |
| 6,626,622 B2 | 9/2003 | Zubko |
| 6,988,761 B1 | 1/2006 | Stidham et al. |
| 7,014,253 B2 | 3/2006 | Oren |
| 7,069,702 B2 | 7/2006 | Ehrlich |
| 7,114,762 B2 | 10/2006 | Smidler |

OTHER PUBLICATIONS

Notice of Allowance documents dated Nov. 2, 2009 for related U.S. Appl. No. 11/972,730 (8 pages).

FIG. 9
FIG. 10
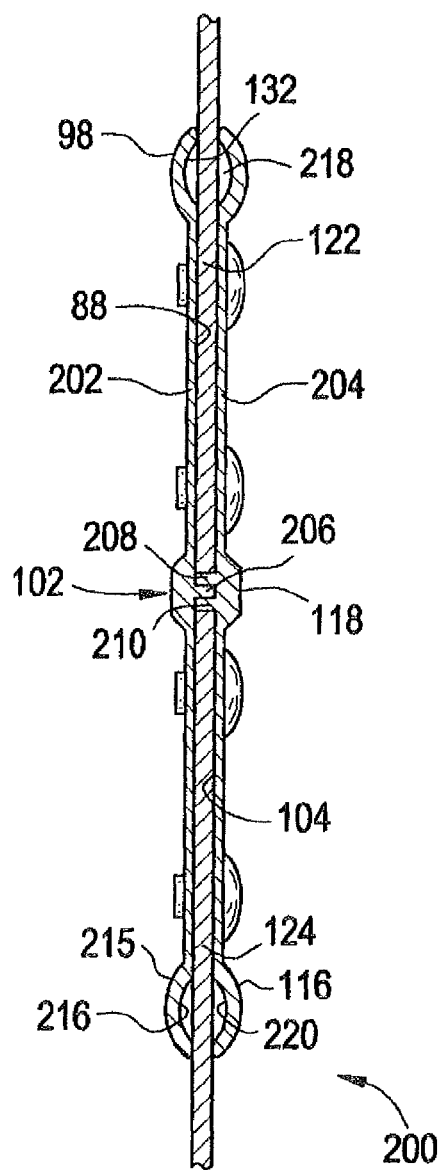
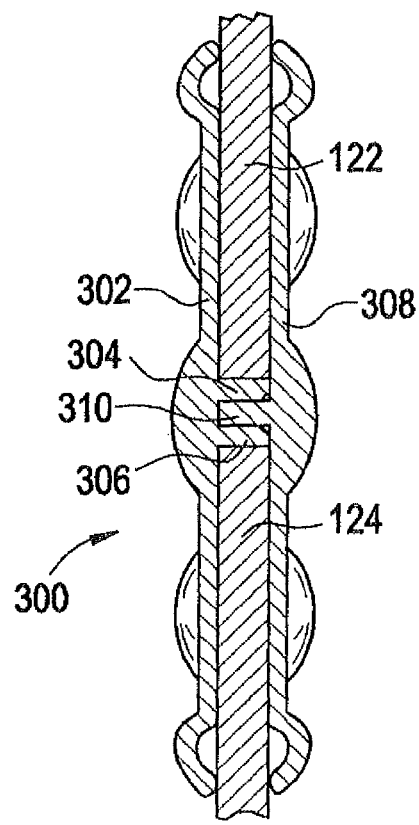

BUTT JOINT FOR TRAILER SIDE WALL

This application is a continuation-in-part application of U.S. patent application Ser. No. 11/972,730 filed on Jan. 11, 2008, Which claims the domestic benefit of U.S. provisional application Ser. No. 60/884,825 filed on Jan. 12, 2007, which disclosures are hereby incorporated by reference.

FIELD OF THE INVENTION

This invention is generally directed to a butt joint for joining a side wall of a trailer to a base rail of a trailer.

BACKGROUND OF THE INVENTION

A side wall of a trailer is formed by at least one side panel positioned over a base rail. The at least one side panel forms an upper portion of the side wall and is joined with the base rail forming the lower portion of the side wall. The at least one side panel is joined with the base rail using a lap joint such as that shown in FIG. 1. The lap joint includes a splice member 10 which positions the side panel 12 relative to the base rail 14. The splice member 10, side panel 12, and base rail 14 are secured into position using rivets 16. The side panel 12 and base rail 14 are thus stacked on one another or overlapped to form the lap joint. As a result, an offset is provided at the lap joint and the resulting side wall 8 is not planar. This offset between the side panels 12 and the base rail 14 results in a significant bending moment exerted to the lap joint during trailer operation which can result in deformation of the trailer side wall 8.

The present invention provides a butt joint between the side panels and the base rail which overcomes the problems presented in the prior art and which provides additional advantages over the prior art, such advantages will become clear upon a reading of the attached specification in combination with a study of the drawings.

SUMMARY OF THE INVENTION

Briefly, the present invention discloses a butt joint for assembling side panels of a trailer to the base rail of the trailer to form a side wall. The butt joint positions the side panels over the base rail and vertically aligns the outer surfaces of the side panel and the base rail, which provides for an improved trailer side wall.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 9 is a cross-sectional view of a portion of a side wall of a trailer which incorporates the features of a second embodiment of the butt joint;

FIG. 10 is a cross-sectional view of a portion of a side wall of a trailer which incorporates the features of a third embodiment of the butt joint;

DETAILED DESCRIPTION OF THE ILLUSTRATED EMBODIMENTS

Figure 1:
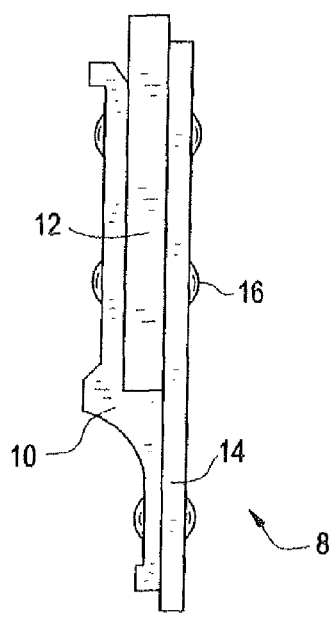
FIG. 1 is a cross-sectional view of a prior art lap joint used in forming a trailer side wall.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Figure 2:
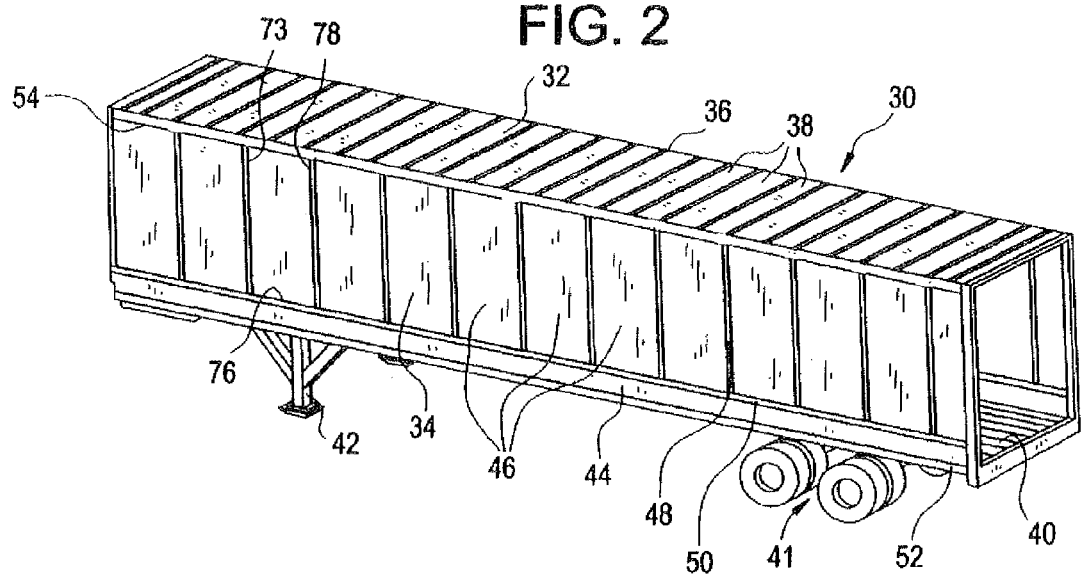
FIG. 2 is a perspective view of a trailer having a side wall formed using a butt joint which incorporates the features of a first embodiment of the present invention.
Figure 11:
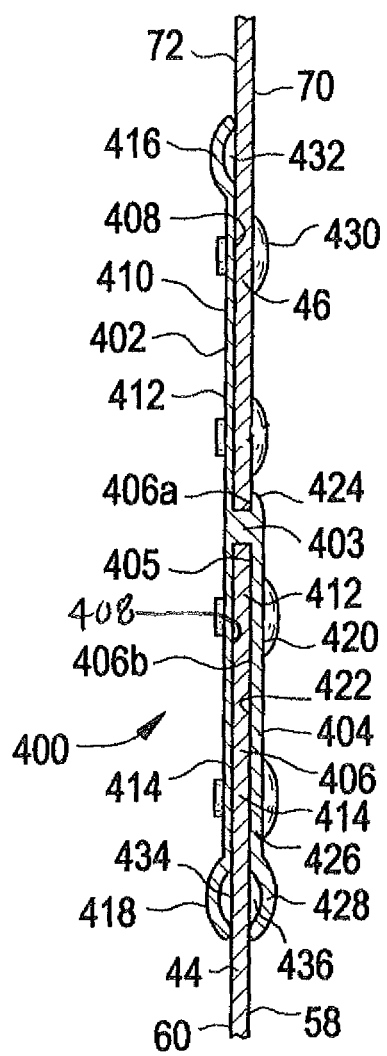
FIG. 11 is a cross-sectional view of a portion of a side wall of a trailer which incorporates the features of a fourth embodiment of the butt joint.
Figure 12:
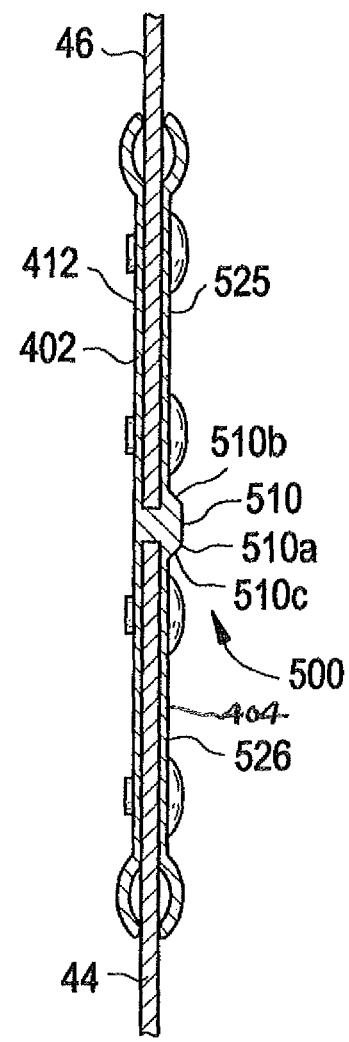
FIG. 12 is a cross-sectional view of a portion of a side wall of a trailer which incorporates the features of a fifth embodiment of the butt joint.
Figure 13:
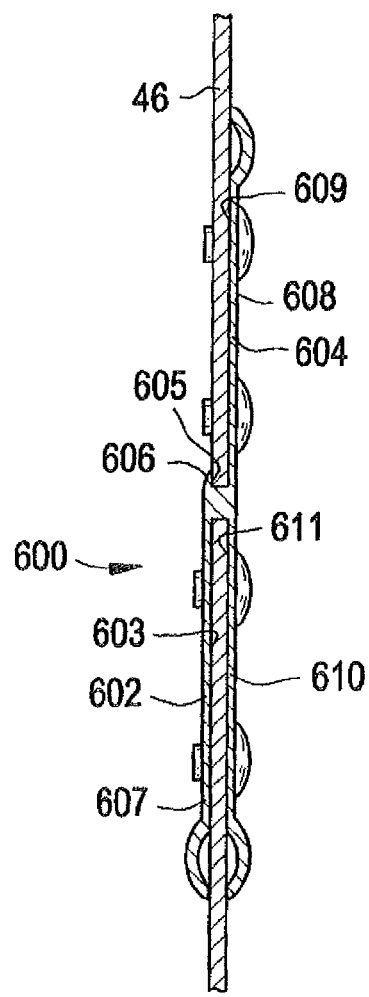
FIG. 13 is a cross-sectional view of a portion of a side wall of a trailer which incorporates the features of a sixth embodiment of the butt joint.
Figure 14:
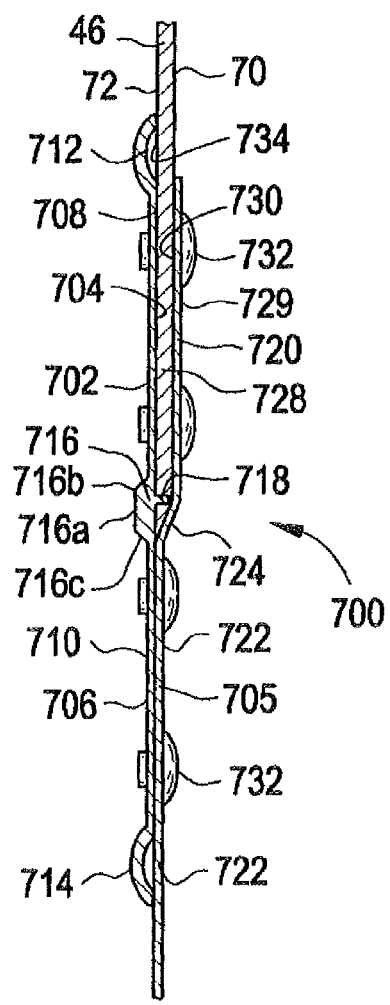
FIG. 14 is a cross-sectional view of a portion of a side wall of a trailer which incorporates the features of a seventh embodiment of the butt joint.
Figure 15:
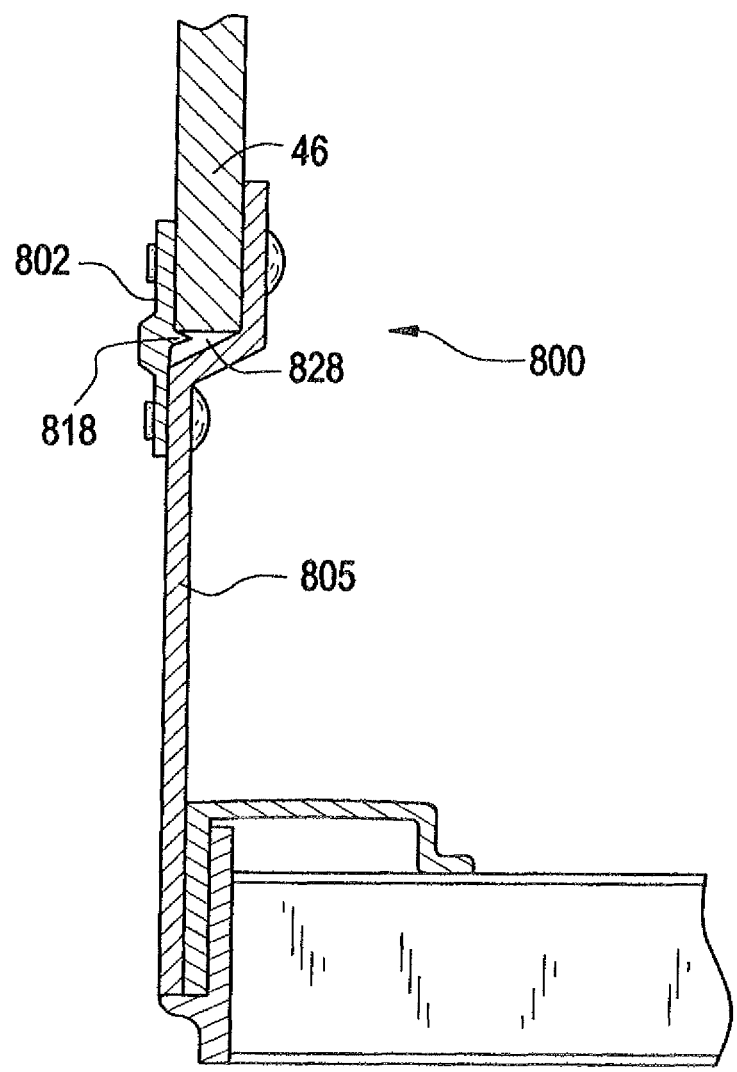
FIG. 15 is a cross-sectional view of a portion of a side wall of a trailer which incorporates the features of an eighth embodiment of the butt joint.
Figure 26:
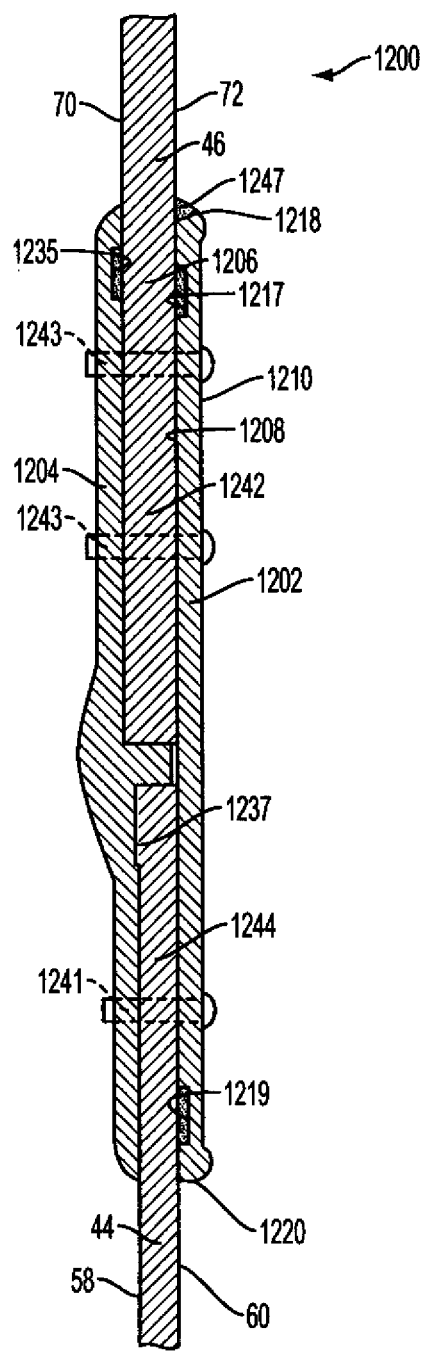
FIG. 26 is a cross-sectional view of a portion of a side wall of a trailer which incorporates the features of a twelfth embodiment of the butt joint.
Figure 27:
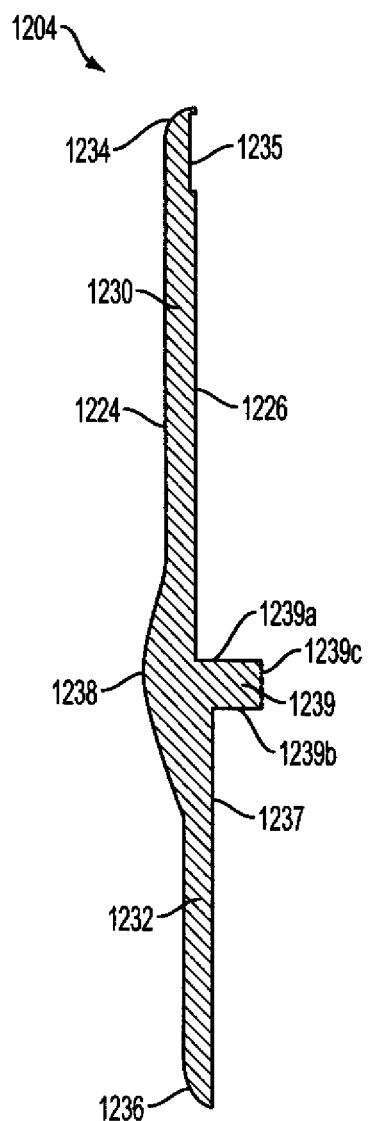
FIG. 27 is a cross-sectional view of an inner element of the twelfth embodiment of the butt joint.

A butt joint 50 (shown as reference numeral 50 in FIG. 2, but can also be butt joint 200, 300, 400, 500, 600, 700, 800, 900, 1000, 1100 or 1200) is used in forming the side walls 34 of a trailer 30 as shown in FIG. 2. A first embodiment of the butt joint 50 is shown in FIGS. 2-8; a second embodiment of the butt joint 200 is shown in FIG. 9; a third embodiment of the butt joint 300 is shown in HG. 10; a fourth embodiment of the butt joint 400 is shown in FIG. 11; a fifth embodiment of the butt joint 500 is shown in FIG. 12; a sixth embodiment of the butt joint 600 is shown in FIG. 13; a seventh embodiment of the butt joint 700 is shown in FIG. 14; an eighth embodiment of the butt joint 800 is shown in FIG. 15; a ninth embodiment of the butt joint 900 is shown in FIGS. 16-19; a tenth embodiment of the butt joint 1000 is shown in FIG. 20; an eleventh embodiment of the butt joint 1100 is shown in FIGS. 21-25; and a twelfth embodiment of the butt joint is shown in FIGS. 26-27.

The trailer 30 connects to a tractor (not shown) by conventional means, such as a fifth wheel assembly (not shown). The trailer 30 includes a body formed from a pair of rectangular side walls 34, a front wall (not shown), a rear door (not shown), a roof 36 formed by at least one top panel 38, and a floor structure 40. The floor structure 40 is supported by a conventional rear undercarriage assembly 41 and has a landing gear 42 secured thereunder. The side walls 34 are formed from a base rail 44 extending from a front of the trailer 30 to a rear of the trailer 30 and a plurality of side panels 46. Each side panel 46 is joined to an adjacent side panel 46 through a vertical joint 48 which is known in the art. Alternatively, the side wall 34 can be formed of a continuous sheet. The butt joint 50 connects the lower portions of the side panels 46 to the base rail 44. A bottom rail 52 extends from the front of the trailer 30 to the rear of the trailer 30 and joins the base rail 44 to the floor structure 40. A top rail 54 extends from the front of the trailer 30 to the rear of the trailer 30 and joins the upper ends of the side wall 34 with the roof 36.

The base rail 44 is formed from metal, such as aluminum, and is generally rectangularly-shaped and planar. The base rail 44 has opposite inner and outer surfaces 58, 60, an upper edge 62, a lower edge 64 opposite the upper edge 62, a front edge 66, and a rear edge (not shown) opposite the front edge 66. Due to manufacturing processes, the base rail is often cambered or arc-shaped. Thus, the upper edge 62 of the base rail 44, at its center, is curved up or down. Although the base rail can be further processed to eliminate the arc and provide a planar upper edge 62, such additional processing increases the cost of the trailer. The base rail 44 is formed as a solid, one-piece member that extends the length of the trailer, and is known in the art as a "high" base rail 44. The portion of the base rail 44 below the components of the butt joint 50 is devoid of joints or fasteners and has a certain predetermined height. The base rail 44 acts as an external scuff plate to provide resistance against damage from another trailer rubbing against the outside of the trailer 30, and the base rail 44 acts as an internal scuff plate to provide resistance against damage from forklifts operating on the inside of the trailer 30. The base rail 44 is a structural member which carries the bending moments, tensile and shear forces of the side wall. The "high" base rail 44 offers significant improvements in the side wall strength and stiffness; the base rail 44 expands the trailer payload and boosts the floor load capacity of the trailer. The base rail 44 can be repaired by cutting, welding, grinding and flattening. This provides a lower trailer maintenance cost, lower repair cost and lower equipment ownership cost.

Figure 8:
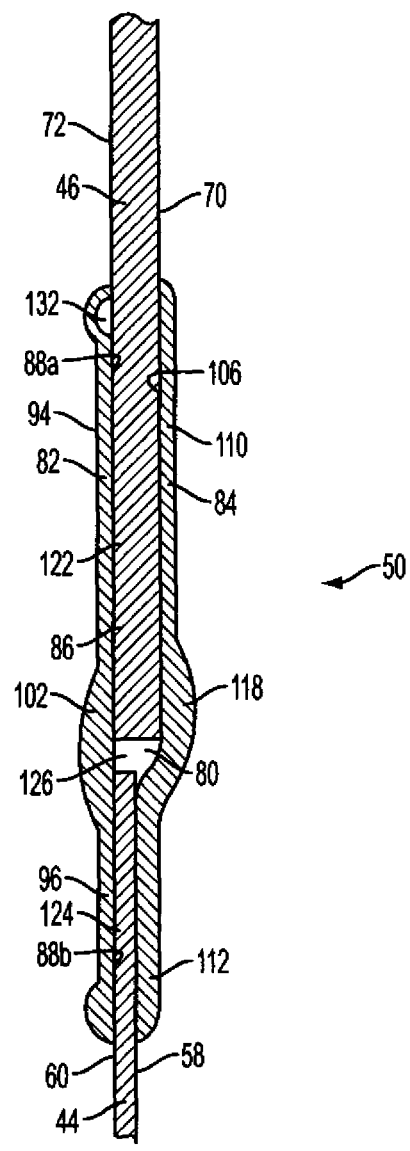
FIG. 8 is a cross-sectional view along line 8-8 of FIG. 3.
Figure 8A:
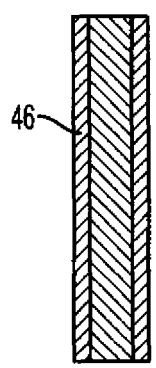
FIG. 8A shows the panel used in the present invention.

Each side panel 46 is formed from a composite plate formed from a pair of skins, with a core between the skins, as shown in FIG. 8A. As is known in the art, the skins are formed of hard steel (80-ksi-minimum-yield strength). Each side panel 46 is generally-rectangular and planar. Each side panel 46 includes opposite inner and outer surfaces 70,72, an upper edge 74, a lower edge 76 opposite the upper edge 74, a front edge 73, and a rear edge 78 opposite the front edge 73. Each side panel 46 is positioned adjacent another side panel 46 such that the rear edge 78 of the first side panel 46 is adjacent the front edge 73 of an adjacent side panel 46. The thickness of each side panel 46 is slightly greater than the thickness of the base rail 44. As is known in the art, composite plates offer structural strength, are light weight, increase the trailer inside width, and are resistant to dents from impacts.

Figure 3:
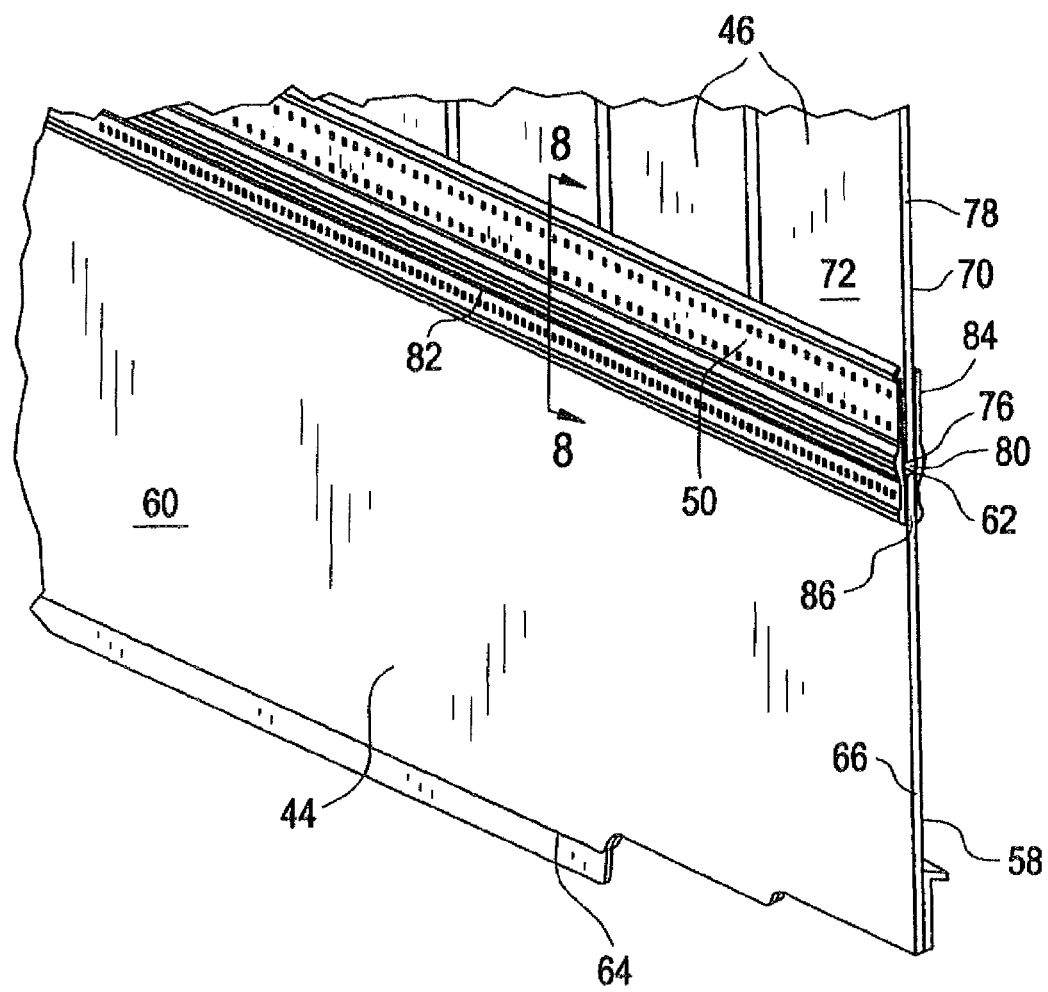
FIG. 3 is an outside perspective view of a portion of a trailer side wall which incorporates a first embodiment of the butt joint.

As shown in FIG. 3, the side panels 46 are positioned over the base rail 44 such that the lower edges 76 of the side panels 46 are proximate the upper edge 62 of the base rail 44. A gap 80 is provided between the lower edges 76 of the side panels 46 and the upper edge 62 of the base rail 44. As noted earlier, the upper edge 62 of the base rail 44 is often arc-shaped. In such an instance, the height of the gap 80 proximate the front and rear edges 66, 68 will vary relative to the height of the gap 80 proximate the center of the base rail 44. In some instances, no gap 80 results between the upper edge 62 of the base rail 44 and the lower edges 76 of the side panels 46. The side panels 46 and base rail 44 are further aligned such that the outer surfaces 72 of the side panels 46 and the outer surface 60 of the base rail 44 lie in the same plane.

The base rail 44 is placed at the "critical zone", i.e, the bottom two feet of the sidewall to resist cutting due to either rubbing by another trailer on the outside, or by a forklift operating on the inside of the trailer. The composite panels are used above the "critical zone" to decrease the weight of the trailer and to increase the trailer width. By positioning composite plates directly above the base rail 44 (i.e., in one vertical plane), the bending moment in the butt joint 50 is significantly lowered. This boosts the stiffness of the sidewall, floor load rating and trailer overall payload capacity.

FIGS. 2-8 illustrate the butt joint 50 of the first embodiment. The butt joint 50 includes an outer member 82 and an inner member 84 spaced from the outer member 82. A channel 86 is provided between the outer and inner members 82, 84 for receiving the side panels 46 and the base rail 44.

Figure 6:
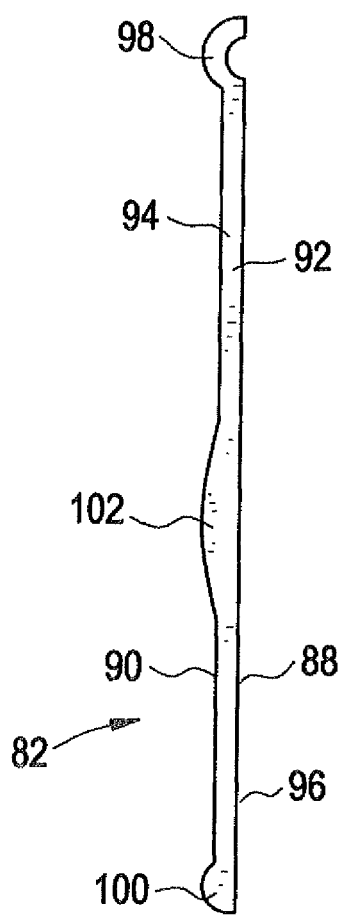
FIG. 6 is an elevational end view of an outer element of the butt joint of FIG. 3.
Figure 7:
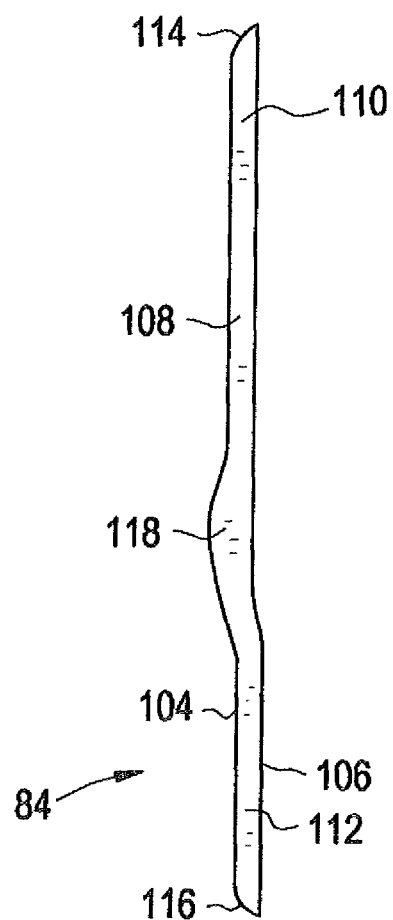
FIG. 7 is an elevational end view of an inner element of the but joint of FIG. 3.

As best shown in FIG. 6, the outer member 82 generally includes an inner surface 88, an outer surface 90, a front end (not shown), a rear end 92, an upper portion 94, a lower portion 96, an upper end 98, a lower end 100, and a rub rail 102. The inner surface 88 is generally planar. Each of the upper end 98, lower end 100, and the rub rail 102 is elongated, extends from the front end to the rear end 92, and are generally parallel to each other. The rub rail 102 is spaced from the upper and lower ends 98, 100 and extends outwardly. The rub rail 102 has a generally arc-shaped cross-section extending from the outer surface 90 such that the rub rail 102 provides a thickened portion of the outer member 82. The upper end 98 has a generally annularly-shaped cross-section and extends from the upper portion 94. The lower end 100 provides a generally semi-circularly-shaped cross-section and extends from the outer surface 90 proximate the lower portion 96. The upper portion 94 extends from the rub rail 102 to the upper end 98 and from the front end of the outer member 82 to the rear end 92. The lower portion 96 extends from the rub rail 102 to the lower end 100 and from the front end of the outer member 82 to the rear end 92.

Apertures are provided at spaced apart positions along the length of the outer member 82 between the upper end 98 and the rub rail 102. Apertures are provided at spaced apart positions along the length of the outer member 82 between the lower end 100 and the rub rail 102. Each aperture extends from the outer surface 90 to the inner surface 88 of the outer member 82.

The inner member 84 generally includes an inner surface 104, an outer surface 106, a front end 108, a rear end (not shown), an upper portion 110, a lower portion 112, an upper end 114, a lower end 116 and a rub rail 118. Each of the upper end 114, lower end 116, and rub rail 118 extends from the front end 108 to the rear end of the inner member 84 and are generally parallel to each other. The rub rail 118 is spaced from the upper and lower ends 114, 116 and extends inwardly from the inner surface 104. The rub rail 118 extends inwardly from the inner surface 104 and has a generally arc-shaped cross-section such that the rub rail 118 provides a thickened portion of the inner member 84. The lower portion 112 extends from the rub rail 118 to the lower end 116, and from the front end 108 to the rear end of the inner member 84. The upper portion 110 extends from the rub rail 118 to the upper end 114, and from the front end 108 to the rear end of the inner member 84. Upper and lower portions 110, 112 are offset. Accordingly, the outer surface 106 of the upper portion 110 is positioned inwardly (relative to the interior of the trailer 30) of the outer surface 106 of the lower portion 112.

Apertures are provided at spaced apart positions along the length of the inner member 84 between the lower end 116 and the rub rail 118. Apertures are provided at spaced apart positions along the length of the inner member 84 between the rub rail 118 and the upper end 114. Each aperture extends from the inner surface 104 to the outer surface 106 of the inner member 84.

As best shown in FIG. 8, the channel 86 is defined between the outer member 82 and the inner member 84 when the outer and inner members 82, 84 are faced towards each other, but are spaced apart a distance equal to the width of the side wall 34. More specifically, the channel 86 is defined by the inner surface 88 of the outer member 82 and the outer surface 106 of the inner member 84. The channel 86 includes an upper portion 122 provided between the inner surface 88 of the upper portion 94 of the outer member 82 and the outer surface 106 of the upper portion 110 of the inner member 84, a lower portion 124 provided between an inner surface 88 of the of the lower portion 96 of the outer member 82 and the outer surface 106 of the lower portion 112 of the inner member 84, and a transition portion 126 provided between the inner surface 88 of the rub rail 102 of the outer member 82 and the outer surface 106 of the rub rail 118 of the inner member 84. As shown, the width of the upper portion 122 of the channel 86 is greater than the width of the lower portion 124 of the channel 86.

The side panels 46 are positioned in the upper portion 122 of the channel 86 and the base rail 44 is positioned in the lower portion 124 of the channel 86 such that the gap 80 between the lower edge 76 of the side panels 46 and the upper edge 62 of the base rail 44 is positioned in the transition portion 126 of the channel 86. The outer surfaces 72 of the side panels 46 abut the inner surface 88 of the upper portion 94 of the outer member 82 and the inner surfaces 70 of the side panels 46 abut the outer surface 106 of the upper portion 100 of the inner member 84. The outer surface 60 of the base rail 44 abuts the inner surface 88 of the lower portion 96 of the outer member 82 and the inner surface 58 of the base rail 44 abuts the outer surface 106 of the lower portion 112 of the inner member 84. The planar nature of the inner surface 88 of the outer member 82 provides planar positioning of the outer surfaces 72 of the side panels 46 with the outer surface 60 of the base rail 44. As shown, the width of the side panel 46 is greater that the width of the base rail 44. The upper portion 122 of the channel 86 is therefore wider than the lower portion 124 of the channel 86 to accommodate the side panels 46 which have a greater width than the base rail 44. If side panel 46 does not have a width which is greater than the width of the base rail 44, the upper portion 122 of the channel 86 is not wider than the lower portion 124 of the channel 86.

Figure 4:
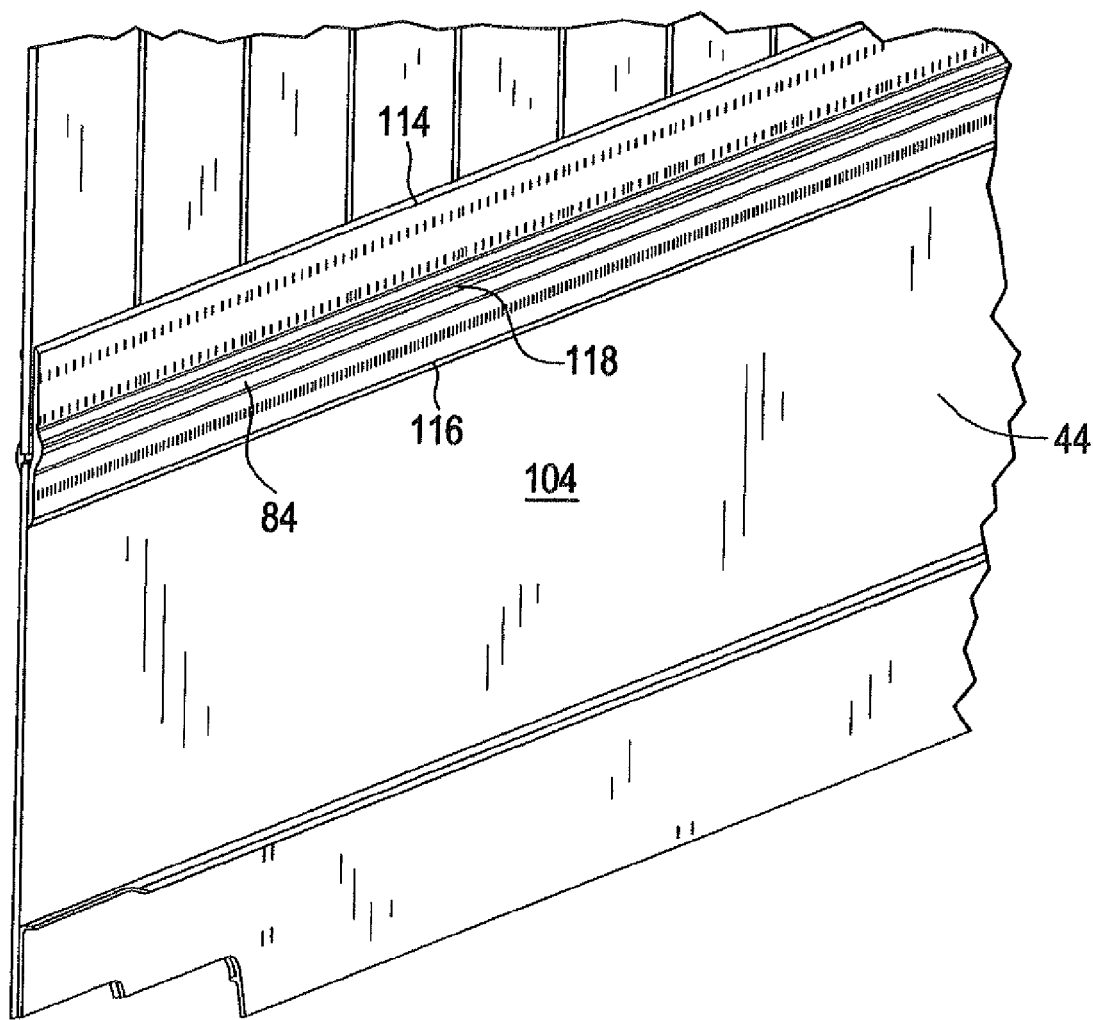
FIG. 4 is an inside perspective view of the portion of the trailer side wall of FIG. 3.
Figure 5:
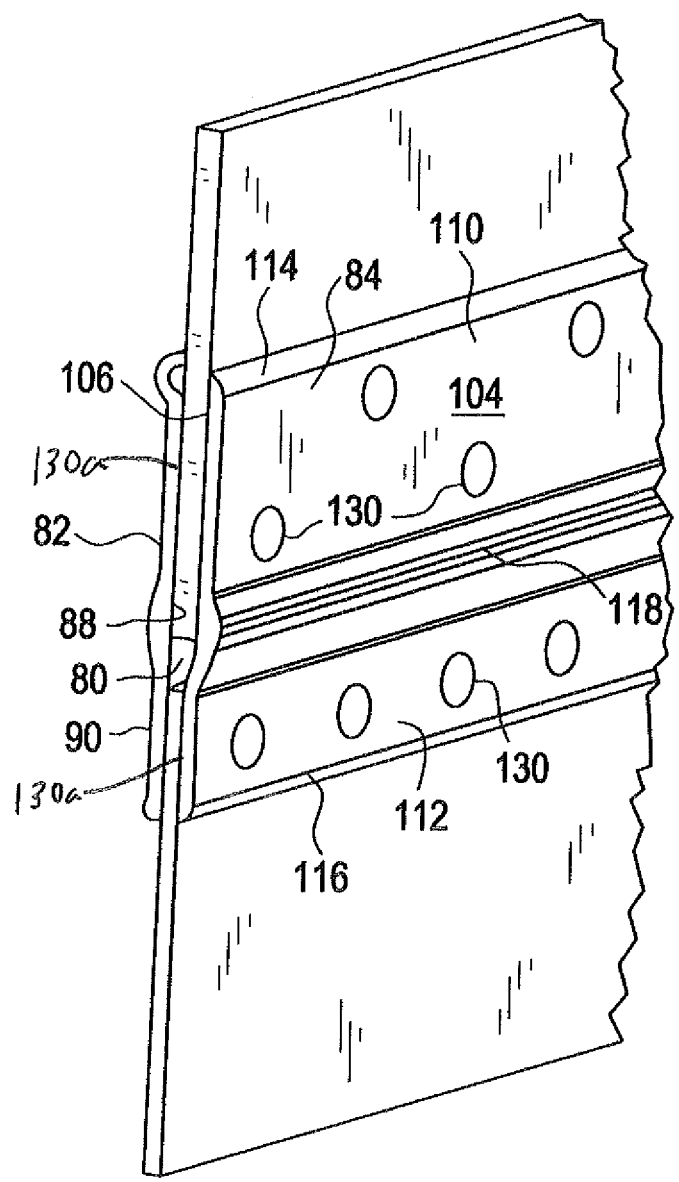
FIG. 5 is an enlarged view of the portion trailer side wall shown in FIG. 4.

As best shown in FIGS. 3-5, fasteners 130 are provided through the apertures of the upper portion 94 of the outer member 82, through the side panels 46 and through the apertures of the upper portion 110 of the inner member 84 to secure the outer and inner members 82, 84 to the side panels 46. Fasteners are also provided through the apertures of the lower portion 96 of the outer member 82, through the base rail 44 and through the apertures of the lower portion 112 of the inner member 84 to secure the outer and inner members 82, 84 to the base rail 44. A butt joint 50 is therefore formed between the side panels 46 and the base rail 44. It is to be understood that alternative means, such as, adhesives 130a could be used to secure the outer and inner members 82, 84 to the side panels 46 and base rail 44, or, a combination of fasteners and adhesives could be used to secure the outer and inner members 82, 84 to the side panels 46 and base rail 44. If only adhesives are used to secure the members 82, 84 then the apertures will be removed from the outer and inner members 42, 44.

By removing the offset as found in the prior art, see FIG. 1, and providing vertical alignment of the outer surfaces 60, 72 of the base rail 44 and the side panels 46, a bending moment exerted to the butt joint 50 during operation of the trailer 30 is minimized. In addition, the outer and inner members 82, 84 act as structural members of the side wall 34 capable of carrying shear and bending forces. Thus, the structural integrity of the side wall 34 is improved by the butt joint 50. Furthermore, the butt joint 50 provides for an improved load capacity and improved floor strength capacity. The butt joint 50 also provides for simplified assembly of the trailer 30, lowers the tare weight of the trailer 30 and lowers the manufacturing costs.

The rub rail 102 of the outer member 82 and the rub rail 118 of the inner member 84 carry vertical compressive forces acting on the butt joint 50 and prevent the outer and inner members 82, 84 from deforming as a result of such forces.

When the outer member 82 is positioned proximate the side panels 46, a cavity 132 (see FIG. 8) is defined between the upper end 98 and the outer surfaces of the side panels 46. A sealant is placed in the cavity 132 to prevent moisture from entering the trailer 30 through the butt joint 50. Furthermore, in the event fasteners 130 are used in assembling the butt joint 50 with the panels 46 and the base rail 44, the rub rails 102, 118 provide protection to the fasteners 130. The rub rails 102, 118 prevent shearing off of the fasteners 130 in the event the trailer 30 rubs against another trailer or in the event cargo or equipment used to load cargo rubs along the interior of the trailer side wall 34. Such protection results in lower equipment maintenance cost.

FIG. 9 shows the second embodiment of the butt joint 200. The butt joint 200 includes an outer member 202 and an inner member 204 which are similar to the outer and inner members 82, 84 of the butt joint 50, with the following exceptions.

The outer member 202 includes an inwardly extending tongue 206. The tongue 206 extends opposite the rub rail 102 and is generally perpendicular to the inner surface 88 of the outer member 202. The tongue 206 extends from the front end to the rear end 92 of the outer member 202. Unlike the lower end 100 of the outer member 82 which provides a generally semi-circularly shaped cross-section, the lower end 215 of the outer member 202 provides an arc-shaped cross-section.

The inner member 204 includes an upper flange 208 and a lower flange 210, each extending outwardly opposite the rub rail 118. The upper and lower flanges 208, 210 extend from the front end to the rear end of the inner member 204. The upper and lower flanges 208, 210 generally extend perpendicular to the inner surface 104 of the inner member 204. A slot is provided between the upper and lower flanges 208, 210. A sealant cavity 218 is provided by the upper edge 114 of the inner member 204 and a sealant cavity 220 is provided by the lower edge 116 of the inner member 204.

When the butt joint 200 is assembled with the side panels 46 and the base rail 44, the tongue 206 of the outer member 202 extends within the slot provided between the upper and lower flanges 208, 210 of the inner member 204. The interengaged tongue 206 and flanges 208, 210 provide a bridge between the outer member 202 and the inner member 204 which separates the upper portion 122 of the channel 86 from the lower portion 124 of the channel 86. As shown, the width of the upper portion 122 of the channel 86 is greater than the width of the lower portion 124 of the channel 86.

The side panels 46 are positioned in the upper portion 122 of the channel 86. The lower edge of each side panel 46 contacts an upper surface of the upper flange 208.

The base rail 44 is positioned in the lower portion 124 of the channel 86. Portions of the upper edge of the base rail 44 abut the lower surface of the lower flange 210. As noted earlier, the height of the base rail 44 may be greater at its center than the height of the base rail 44 proximate its front and rear edges 66, 68. Thus, it is likely the base rail 44 will contact the lower surface of the lower flange 210 proximate the center of the base rail 44, and a gap will remain between the base rail 44 and the lower surface of the lower flange 210.

The planar nature of the inner surface 88 of the outer member 202 of the butt joint 200 provides planar positioning of the outer surfaces of the side panels 46 and base rail 44. The widths of the upper and lower portions 122, 124 of the channel 86 are determined based upon respective widths of the side panels 46 and base rail 44 to be positioned within the channel 86. As shown, the width of the side panels 46 is greater than the width of the base rail 44 and, therefore, the upper portion 122 of the channel 86 is wider than the lower portion 124 of the channel 86. It is to be understood that if the width of the side panel 46 was not greater than the width of the base rail 44, the upper portion 122 of the channel 86 would not be wider than the lower portion 124 of the channel 86.

In addition to providing support for vertical compressive forces, the flanges 208, 210 assist in aligning the side panels 46 and base rail 44 within the channel 86 prior to fastening.

FIG. 10 illustrates the butt joint 300 of the third embodiment. The butt joint 300 is identical to the butt joint 50 shown in FIG. 9 except for the following. Rather than a single inwardly extending tongue, the outer member 302 of the butt joint 300 includes upper and lower inwardly extending flanges 304, 306. Rather than two outwardly extending flanges, the inner member 308 includes a single outwardly extending tongue 310. When assembled, the tongue 310 of the inner member 308 extends within the gap provided between the upper and lower flanges 304, 306 of the outer member 302. The interengaged tongue 310 and flanges 304, 306 provide a bridge between the outer member 302 and the inner member 308.

As shown, the upper and lower portions 122, 124 of the channel 86 have the same width. The portions 122, 124 of the channel 86 can of course be modified to accept panels 46 and base rails 44 having varying widths.

FIG. 11 illustrates the butt joint 400 of the fourth embodiment. The butt joint 400 includes an outer member 402 and an inner member 404 spaced from and connected to the outer member 402 by a bridge 403. The outer member 402, inner member 404 and bridge 403 are integrally formed. A channel 406 is provided between the outer and inner members 402, 404 for receiving the side panels 46 and the base rail 44.

The outer member 402 generally includes an inner surface 408, an outer surface 410, a front end (not shown), a rear end (not shown), an upper portion 412, a lower portion 414, an upper end 416 extending from the upper portion 412, and a lower end 418 extending from the lower portion 414. The inner surface 408 is generally planar. The upper end 416 and the lower end 418 are elongated, extend from the front end to the rear end, and are generally parallel to each other. The upper and lower ends 416, 418 have a generally annularly-shaped cross-section. The upper portion 412 extends froth the bridge 403 to the upper end 416 and from the front end of the outer member 402 to the rear end. The lower portion 414 extends from the bridge 403 to the lower end 418 and from the front end of the outer member 402 to the rear end.

Apertures are provided at spaced apart positions along the length of the outer member 402 between the upper end 416 and the bridge 403. Apertures are provided at spaced apart positions along the length of the outer member 402 between the lower end 418 and the bridge 403. Each aperture extends from the outer surface 410 to the inner surface 408 of the outer member 402.

The inner member 404 generally includes an inner surface 420, an outer surface 422, a front end (not shown), a rear end (not shown), an upper tab 424, a lower portion 426, and a lower end 428. The lower end 428 extends from the front end to the rear end of the inner member 404. The lower portion 426 extends from the bridge 403 to the lower end 428, and from the front end to the rear end of the inner member 404. The upper tab 424 extends upwardly from the bridge 403, and from the front end to the rear end of the inner member 404. The upper tab 424 and the lower portion 426 are offset. Accordingly, the outer surface 422 of the upper tab 424 is positioned inwardly (relative to the interior of the trailer 30) of the outer surface 422 of the lower portion 426.

Apertures are provided at spaced apart positions along the length of the inner member 404 between the lower end 428 and the bridge 403. The apertures extend from the inner surface 420 to the outer surface 422 of the inner member 404.

The channel 406 is defined between the outer member 402 and the inner member 404. More specifically, the channel 406 is defined by the inner surface 408 of the outer member 402 and the outer surface 422 of the inner member 404. The channel 406 includes an upper portion 406a provided between the inner surface 408 of the upper portion 412 of the outer member 402 and the outer surface 422 of the upper tab 424 of the inner member 404, and a lower portion 406b provided between an inner surface 408 of the lower portion 414 of the outer member 402 and the outer surface 422 of the lower portion 426 of the inner member 404. The width of the upper portion 406a of the channel 406 is greater than the width of the lower portion 406b of the channel 406.

The side panels 46 are positioned in the upper portion 406a of the channel 406 such that the lower edge of the side panel 46 contacts an upper surface of the bridge 403. The base rail 44 is positioned in the lower portion 406b of the channel 406 such that at least a portion of the upper end of the base rail 44 contacts a lower surface of the bridge 403. The outer surfaces 72 of the side panels 46 abut the inner surface 408 of the upper portion 412 of the outer member 402 and the inner surfaces 70 of the side panels 46 abut the outer surface 422 of the upper tab 424 of the inner member 404. The outer surface 60 of the base rail 44 abuts the inner surface 408 of the lower portion 414 of the outer member 402 and the inner surface 58 of the base rail 44 abuts the outer surface 422 of the lower portion 426 of the inner member 404. The planar nature of the inner surface 408 of the outer member 402 provides planar positioning of the outer surfaces 72 of the side panels 46 with the outer surface 60 of the base rail 44. As shown, the width of the side panel 46 is greater that the width of the base rail 44. The upper portion 406a of the channel 406 is therefore wider than the lower portion 406b of the channel 406 to accommodate the side panels 46 which have a greater width than the base rail 44. If side panel 46 does not have a width which is greater than the width of the base rail 44, the upper portion 406a of the channel 406 will not be formed wider than the lower portion 406b of the channel 406.

Fasteners 430 are provided through the apertures of the upper portion 412 of the outer member 402 and through the side panels 46 to secure the outer members 402 to the side panels 46. Fasteners are also provided through the apertures of the lower portion 414 of the outer member 402, through the base rail 44 and through the apertures of the lower portion 426 of the inner member 404 to secure the outer and inner members 402, 404 to the base rail 44. The butt joint 400 is therefore formed between the side panels 46 and the base rail 44. It is to be understood that alternative means, such as, adhesives could be used to secure the outer and inner members 402, 404 to the side panels 46 and base rail 44, or a combination of fasteners and adhesives could be used to secure the outer and inner members 402,404 to the side panels 46 and base rail 44. If only adhesives are used to secure the members 402, 404 then the apertures will be removed from the outer and inner members 402, 404.

Similar to the butt joint 50, by removing the offset as found in the prior art, see FIG. 1, and providing vertical alignment of the outer surfaces 60, 72 of the base rail 44 and the side panels 46, a bending moment exerted to the butt joint 400 during operation of the trailer 30 is minimized. In addition, the outer and inner members 402, 404 act as structural members of the side wall 34 capable of carrying shear and bending forces. Thus, the structural integrity of the side wall 34 is improved by the butt joint 400. Furthermore, the butt joint 400 provides for an improved load capacity and improved floor strength capacity. The butt joint 400 also provides for simplified assembly of the trailer 30, lowers the tare weight of the trailer 30 and lowers the manufacturing costs.

When the outer member 402 is positioned proximate the side panels 46 and base rail 44, a cavity 432 is defined between the upper end 416 and the outer surfaces of the side panels 46 and a cavity 434 is defined between the lower end 418 and the outer surface of the base rail 44. When the inner member 404 is positioned proximate the base rail 44 a cavity 436 is defined between the lower end 428 and the outer surface 58 of the base rail 44. A sealant is placed in the cavities 432, 434, 436 to prevent moisture from entering the trailer 30 through the butt joint 400.

FIG. 12 illustrates the butt joint 500 of the fifth embodiment. The butt joint 500 is identical to the butt joint 400 shown in FIG. 11 except for the following features. Rather than providing an upper tab 424 on the inner member 404, an upper portion 525 is provided which is approximately the same length as the upper portion 412 of the outer member 402. The inner member 404 further includes an elongated inwardly extending rub rail 510 which extends from the front of the inner member 404 to the rear of the inner member 404. The innermost surface 510a of the rub rail 510 is generally planar and parallel to the side panel 46 and base rail 44. A first inclined surface 510b extends from the inner most surface 510a to the upper portion 525 of the inner member 404 and a second inclined surface 510c extends from the inner most surface 510a to a lower portion 526 of the inner member 404.

FIG. 13 illustrates the butt joint 600 of the sixth embodiment. The butt joint 600 includes an outer member 602 and an inner member 604. The butt joint 600 is similar to the butt joint 400 of FIG. 11 with the following exceptions. The tab 424 of the butt joint 400 is replaced with an upper portion 608 of the inner member 604, and the upper portion of the outer member 412 of the butt joint 400 is replaced with a tab 606. Thus, the inner surface 605 of the tab 606 and the inner surface 603 of a lower portion 607 of an outer member 602 are planar and the outer surface 609 of the upper portion 608 of the inner member 604 is off set from the outer surface 611 of the lower portion 610 of the inner member 604.

FIG. 14 illustrates the butt joint 700 of the seventh embodiment. The butt joint 700 is generally formed by an outer member 702 and a base rail 705 having an offset upper portion 720. The portions of the base rail 705 proximate to the outer member 702 form the inner member. The outer member 702 generally includes an inner surface 704, an outer surface 706, a front end (not shown), a rear end (not shown), an upper portion 708, a lower portion 710, an upper end 712, a lower end 714, a rub rail 716, and a tongue 718. The inner surface 704 of the outer member 702 is generally planar. The upper end 712, the lower end 714, the rub rail 716, and the tongue 718 extend from the front end of the outer member 702 to the rear end of the outer member 702 and are generally parallel to each other. The tongue 718 extends inwardly and is positioned opposite the rub rail 716. The rub rail 716 is elongated and extends from the front end to the rear end of the outer member. The rub rail 716 includes first planar surface 716a which is generally parallel to the inner surface 704 of the outer member 702, a second inclined surface 716b which extends inwardly from the first surface 716 of the upper portion 708, and a third inclined surface 716c which extends inwardly from the first surface 716a to the lower portion 710. The upper portion 708 of the outer member 702 extends from the rub rail 716 to the upper end 712 and from the front end of the outer member 702 to the rear end of the outer member 702. The lower portion 706 of the outer member 702 extends from the rub rail 716 to the lower end 714 and from the front end of the outer member 702 to the rear end of the outer member 702.

Apertures are provided at spaced apart positions along the length of the outer member 702 between the upper edge 712 and the rub rail 716. Apertures are also provided at spaced apart positions along the length of the outer member 702 between the lower edge 714 and the rub rail 716. Each aperture extends from the outer surface 706 of the outer member 702 to the inner surface 704 of the outer member 702.

The base rail 705 includes the offset upper portion 720, a lower portion 722, a transition portion 724 between the upper and lower portions 720, 722, an inner surface 729, an outer surface 730, and front and rear ends (not shown). The upper portion 720 is offset from the lower portion 722 such that the upper portion 720 is positioned inwardly relative to the lower portion 722. The lower portion 722 of the base rail 705 is parallel to the inner surface 704 of the outer member 702 and is in contact with the inner surface 704. The upper portion 720 of the base rail 705 is parallel to the inner surface 704 of the outer member 702, but is spaced from the inner surface 704. The transition portion 724 of the base rail 705 extends inwardly and upwardly from the upper edge of the lower portion 722 to the lower edge of the upper portion 720. The base rail 705 is continuous from the front of the trailer 30 to the rear of the trailer 30, and is known in the art as a "high"

base rail 705. The portion of the base rail 705 below the attachment to the outer member 702 is devoid of joints or fasteners and has a certain predetermined height. The base rail 705 provides resistance against damage from another trailer rubbing against the outside of the trailer 30, and the base rail 705 provides resistance against damage from forklifts operating on the inside of the trailer 30.

When placed between the outer member 702 and the inner member 704, a channel 728 is defined by the inner surface 704 of the outer member 702 and the outer surface 730 of the upper portion 720 of the base rail 705. The tongue 718 of the outer member 702 contacts the upper portion 720 of the base rail 705 proximate the transition portion 724.

Apertures are provided at spaced apart positions through the upper and lower portions 708, 710 of the outer member 702. Apertures are provided at spaced apart positions through the upper and lower portions 720, 722 of the base rail 705 and are aligned with the apertures of the outer member 702.

When assembled with the side panels 46, the outer surfaces 72 of the side panels 46 contact the inner surface 704 of the outer member 702; the inner surfaces 70 of the side panels 46 contact the outer surface 730 of the upper portion 720 of the base rail 705; and the lower edges 76 of the side panels 46 contact an upper surface of the tongue 718.

Fasteners 732 are provided through the apertures in the upper portion 708 of the outer member 702, through the side panels 46 and through the apertures of the upper portion 720 of the base rail 705 to secure the outer member 702 and the base rail 705 to the side panels 46. Fasteners 732 are provided through the apertures of the lower portion 706 of the outer member 702 and through the lower portion 722 of the base rail 705 to secure the outer member 702 to the base rail 705. The butt joint 700 is provided between the side panels 46 and the lower portion 722 of the base rail 705. It is to be understood that alternative means, such as, for example adhesives could be used to secure the outer member 702 to the side panels 46 and base rail 705 and to secure the side panels 46 to the base rail 705 and the apertures eliminated. In addition, a combination of fasteners and adhesives can be used to secure the outer member 702 to the side panels 46 and base rail 705 and to secure the side panels 46 to the base rail 705.

The butt joint 700 provides vertical alignment between the outer surface 72 of the side panel 46 and the outer surface 730 of the lower portion 722. By removing the offset as found in the prior art, a bending moment exerted on the butt joint 700 during operation of the trailer 30 is minimized. In addition, the outer member 702 acts as a structural member of the side wall 34 capable of carrying sheer and bending forces. The butt joint 700 also provides for simplified assembly of the trailer 30 lowers the tare weight of the trailer 30 and lowers the manufacturing costs.

The rub rail 716 of the outer member 702 carries vertical compressive forces acting on the butt joint 700 and prevents the outer member 702 from deforming as a result of such forces.

When the outer member 702 is positioned proximate the side panels 46, a cavity 734 is defined between the upper end 712 and the outer surface 72 of the side panel 46. A sealant is placed in the cavity 734 to prevent moisture for entering the trailer 30 through the butt joint 700. Furthermore, in the event fasteners are used in assembling the butt joint 700, the panels 46, the rub rail 716 provides protection to the fasteners 732 to prevent shearing off of the fasteners 732.

FIG. 15 illustrates the butt joint 800 of the eighth embodiment. The butt joint 800 includes an outer member 802 and a base rail 805 having an offset upper portion 805. The portions of the base rail 805 proximate to the outer member 802 form the inner member. The base rail 805 is continuous from the front of the trailer 30 to the rear of the trailer 30, and is known in the art as a "high" base rail 805. The portion of the base rail 805 below the attachment to the outer member 802 is devoid of joints or fasteners and has a certain predetermined height. The base rail 805 provides resistance against damage from another trailer rubbing against the outside of the trailer 30, and the base rail 805 provides resistance against damage from forklifts operating on the inside of the trailer 30.

The butt joint 800 is identical to the butt joint 700 shown in FIG. 14 with the following exception. The outer member 702 of the butt joint 700 has an inwardly extending tongue 718 opposite the rub rail 716 which extends across the channel 728. In contrast, the outer member 802 of the butt joint 800 includes a tooth 818 extending into the channel between the outer member 802 and the base rail 805, but does not contact the base rail 805. The tooth 818 provides assistance to align the outer member 802 with the side panel 46 when assembling the outer member 802, side panel 46 and base rail 805.

Figure 16:
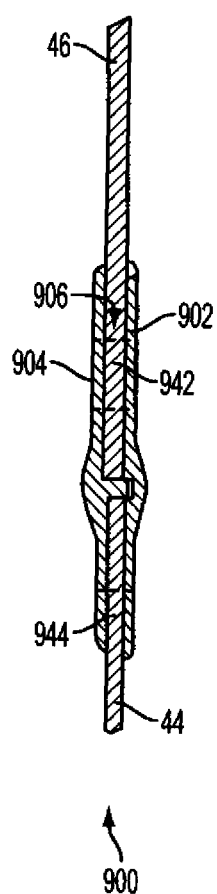
FIG. 16 is a cross-sectional view of a portion of a side wall of a trailer which incorporates the features of a ninth embodiment of the butt joint.
Figure 17:
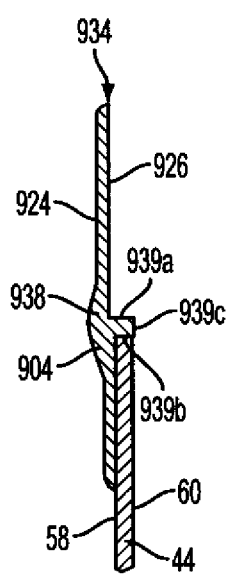
FIG. 17 is a cross-sectional view of an inner element of the ninth embodiment of the butt joint shown assembled with the base rail of the side wall.
Figure 18:
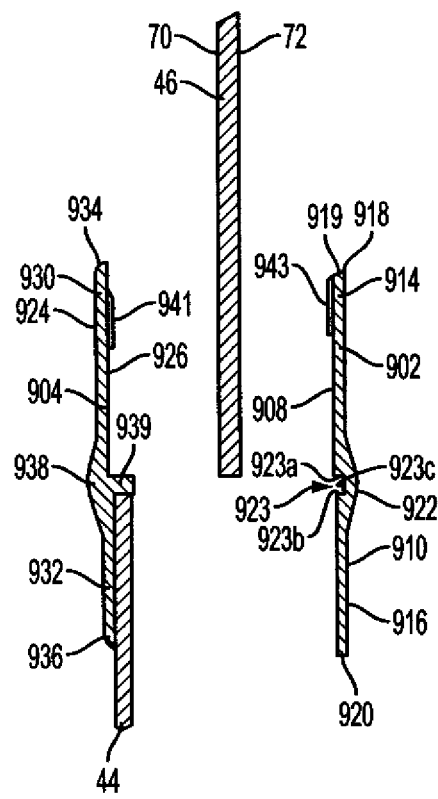
FIG. 18 is an cross-sectional view of the ninth embodiment of the butt joint shown in a partially assembled state.

FIGS. 16-18 illustrate the butt joint 900 of the ninth embodiment. As best shown in FIG. 16, the butt joint 900 includes an outer member 902 and an inner member 904 generally spaced from the outer member 902. A channel 906 is provided between the outer and inner members 902, 904 for receiving the side panels 46 and the base rail 44.

As best shown in FIG. 18, the outer member 902 includes an inner surface 908, an outer surface 910 and front and rear ends (not shown). The outer member 902 has an upper portion 914 extending downwardly from an upper end 918, a lower portion 916 extending upwardly from a lower end 920, and a rub rail 922 and notch 923 between the upper and lower portions 914, 916: The inner surface 908 is generally planar, except for the notch 923 and extends from the upper end 918 to the lower end 920. The rub rail 922 extends outwardly from the upper and lower portions 914, 916 and preferably extends continuously from the front end to the rear end. The rub rail 922 provides a thickened portion of the outer member 902, and as shown has a generally arc-shaped cross-section. The rub rail 922 can take other shapes as desired. The notch 923 is aligned with the rub rail 922 and preferably extends continuously from the front end to the rear end. The notch 923 includes first, second and third surfaces, 923a, 923b, and 923c. First and second surfaces 923a, 923b are generally parallel to each other and generally perpendicular to the inner surface 908. Third surface 923e is generally parallel to the inner surface 908 but outwardly offset therefrom. The upper portion 914 extends from the rub rail 922 to the upper end 918 and from the front end of the outer member 902 to the rear end. The lower portion 916 extends from the rub rail 922 to the lower end 920 and from the front end of the outer member 902 to the rear end. The upper end 918 includes a generally sloped surface 919 which extends generally downwardly from the outer surface 910 to the inner surface 908. The lower end 920 is provided by a surface which is generally perpendicular to the inner and outer surfaces 908, 910 proximate the lower portion 916. A sealant 943, for example PVC foam tape, is provided on the inner surface 908 proximate the upper end 918 of the outer member 902. One or more rows of apertures are provided along the length of the outer member 902 between the upper end 918 and the rub rail 922. One or more rows of apertures are provided along the length of the outer member 902 between the lower end 920 and the rub rail 922. Each aperture extends from the outer surface 910 to the inner surface 908 of the outer member 902.

The inner member 904 includes an inner surface 924, an outer surface 926 and front and rear ends (not shown). The inner member 904 includes an upper portion 930 extending downwardly from an upper end 934, a lower portion 932 extending upwardly from a lower end 936, and a rub rail 938 and tongue 939 between the upper and lower portions 930, 932. The outer surface 926 at the upper portion 930 is offset from the outer surface 926 at the lower portion 932 such that the outer surface of the upper portion 930 is positioned inwardly of the outer surface 926 of the lower portion 932. The rub rail 938 extends inwardly from the upper and lower portions 930, 932 and preferably extends continuously from the front end to the rear end. The rub rail 938 provides a thickened portion of the inner member 904, and as shown has a generally arc-shaped cross-section. The rub rail 938 can take other shapes as desired. The lower portion 932 extends from the rub rail 938 to the lower end 936, and from the front end to the rear end of the inner member 904. The upper portion 930 extends from the rub rail 938 to the upper end 934, and from the front end to the rear end of the inner member 904. The tongue 939 is aligned with the rub rail 938 and extends outwardly from the outer surface 926. The tongue 939 preferably extends continuously from the front end to the rear end. The tongue 939 includes first, second and third surfaces 939a, 939b, 939c (see FIG. 17). The first and second surfaces 939a, 939b are generally parallel to each other and are generally perpendicular to the outer surface 926. The third surface 939c is generally parallel to the outer surface 926. The upper end 934 includes a sloped surface which extends downwardly from the outer surface 926 to the inner surface 924 and the lower end 936 includes a sloped surface which extends downwardly from the inner surface 924 to the outer surface 926. A sealant 941, for example PVC foam tape, is provided on the outer surface 926 proximate the upper end 934 of the inner member 904. One or more rows of apertures (not shown) are provided along the length of the inner member 904 between the lower end 936 and the rub rail 938. One or more rows of apertures (not shown) are provided at spaced apart positions along the length of the inner member 904 between the rub rail 938 and the upper end 934. Each aperture extends from the inner surface 924 to the outer surface 926 of the inner member 904; and the apertures through the inner member 904 align with the apertures provided through the outer member 902.

As best shown in FIG. 16, the channel 906 is defined between the outer member 902 and the inner member 904 when the outer and inner members 902, 904 are positioned proximate one another and the tongue 939 is positioned within the notch 923 of the outer member 902. More specifically, the channel 906 is defined by the inner surface 908 of the outer member 902 and the outer surface 926 of the inner member 904. The channel 906 includes an upper portion 942 above the tongue 939 and provided between the inner surface 908 of the upper portion 914 of the outer member 902 and the outer surface 926 of the upper portion 930 of the inner member 904, and a lower portion 944 below the tongue 939 and provided between an inner surface 908 of the of the lower portion 916 of the outer member 902 and the outer surface 926 of the lower portion 932 of the inner member 904. The tongue 939 divides the upper portion 942 and the lower portion 944 of the channel 906. When the inner member 904 is positioned next to the outer member 902 as shown in FIG. 16, the portion of the channel 906 above the tongue 939 is wider than the portion of the channel below the tongue 939 due to the offset outer surface 926 of the inner member 904.

As shown in FIG. 17, assembly of the butt joint 900 begins by attaching the inner member 904 to the base rail 44. A sealant is provided on the outer surface 926 of the inner member 904 below the tongue 939 and sandwiched between the inner member 904 and the inner surface 85 of the base rail 44. When assembled with the base rail 44, the second surface 939b of the tongue 939 is positioned proximate the upper edge of the base rail 44 and the third surface 939c of the tongue 939 is positioned outwardly of the outer surface 60 of the base rail 44.

Next, the sealant 941 is applied to the outer surface 926 of the inner member 904, a first bead of caulk is provided on the upper surface 939a of the tongue 939, a second bead of caulk is provided on the outer surface 926 of the inner member 904 proximate the upper end 934 and the inner member 904 is butted against the side panel 46. When assembled, the lower edge of the side panel 46 is positioned proximate the first surface 939a of the tongue 939 and the third surface 939c of the tongue 939 extends outwardly of the outer surface 72 of the side panel 46. Next, the outer member 902 along with the sealant 943 is butted against the outer surface 72 of the side panel 46 and to the outer surface 90 of the base rail 44. Caulk is applied between the outer surface 72 of the side panel 46 and the inner surface 908 of the outer member 902 proximate the upper end 918. The inner member 904, side panels 46, base rail 44 and outer member 902 are then clamped together to fix the butt joint 900. As shown in FIG. 16, with the butt joint 900 assembled, the side panels 46 are positioned in the upper portion 942 of the channel 906 above the tongue 939 and the base rail 44 is positioned in the lower portion 944 of the channel 906 below the tongue 939. The outer surfaces 72 of the side panels 46 abut the inner surface 908 of the upper portion 914 of the outer member 902 and the inner surfaces 70 of the side panels 46 abut the outer surface 926 of the upper portion 930 of the inner member 904. The outer surface 60 of the base rail 44 abuts the inner surface 908 of the lower portion 916 of the outer member 902. In addition, the tongue 939 of the inner member 904 extends into the notch 923 of the outer member 902. Further, the butt joint 900 provides that the outer surface 72 of the side panel 46 is planar with the outer surface 60 of the base rail 44.

As described above, the outer and inner members 902, 904 include apertures. When the butt joint 900 is assembled, the apertures of the outer member 902 are aligned with the apertures of the inner member 904. Fasteners, such as rivets, are then provided through the aligned apertures to secure the outer and inner members 902, 904 to the side panels 46 and to the base rail 44. It is to be understood that the butt joint 900 does not require rivets, but rather can be formed with only adhesives. If only adhesives are used to secure the members 902, 904 to the base rail 44 and the side panels 46, then apertures will not be provided through the outer and inner members 902, 904.

Although the sealant 941 is shown as extending from the outer surface 926 of the inner member 904, it is to be understood that a recess could be provided on the outer surface of the inner member 904 such that the sealant 941 when applied to the outer surface 926 would be flush with the outer surface 926. Likewise, although the sealant 943 is shown as extending from the inner surface 908 of the outer member 902, it is to be understood that a recess could be provided on the inner surface 908 such that when applied the sealant 943 is flush with the inner surface 908 of the outer member 902.

The width of the side panel 46 is greater that the width of the base rail 44. The upper portion 942 of the channel 906 is therefore wider than the lower portion 944 of the channel 906 to accommodate the side panels 46 which have a greater width than the base rail 44. By removing the offset as found in the prior art, see FIG. 1, and providing vertical alignment of the outer surfaces 60, 72 of the base rail 44 and the side panels 46, a bending moment exerted to the butt joint 900 during operation of the trailer 30 is minimized. In addition, the outer and inner members 902, 904 act as structural members of the side wall 34 capable of carrying shear and bending forces. Thus, the structural integrity of the side wall 34 is improved by the butt joint 900. Furthermore, the butt joint 900 provides for an improved load capacity and improved floor strength capacity. The butt joint 900 also provides for simplified assembly of the trailer 30, lowers the tare weight of the trailer 30 and lowers the manufacturing costs.

The rub rail 922 of the outer member 902 and the rub rail 938 of the inner member 904 carry vertical compressive forces acting on the butt joint 900 and prevent the outer and inner members 902, 904 from deforming as a result of such forces. The rub rails 922, 938 prevent shearing off of the fasteners in the event the trailer 30 rubs against another trailer or in the event cargo or equipment used to load cargo rubs along the interior of the trailer side wall 34. Such protection results in lower equipment maintenance cost.

The butt joint 900 has been described as including a notch 923 in the outer member 902 and a tongue 939 on the inner member 904. As would be clear to one of ordinary skill in the art, the notch 923 can be provided in the inner member 904 with the corresponding tongue 939 on the outer member 902.

Figure 19:
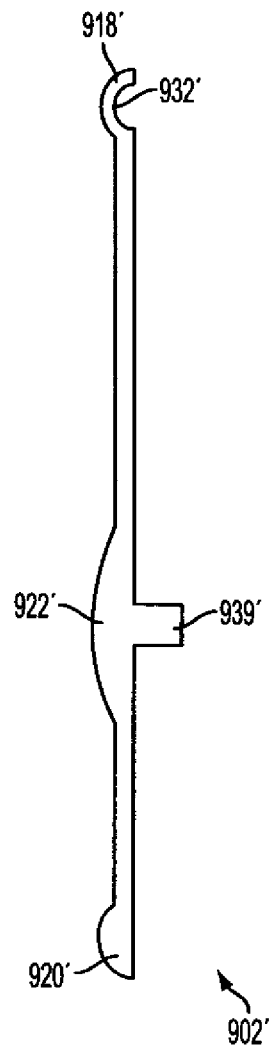
FIG. 19 is an elevational view of an alternative outer member of the ninth embodiment of the butt joint.
Figure 20:
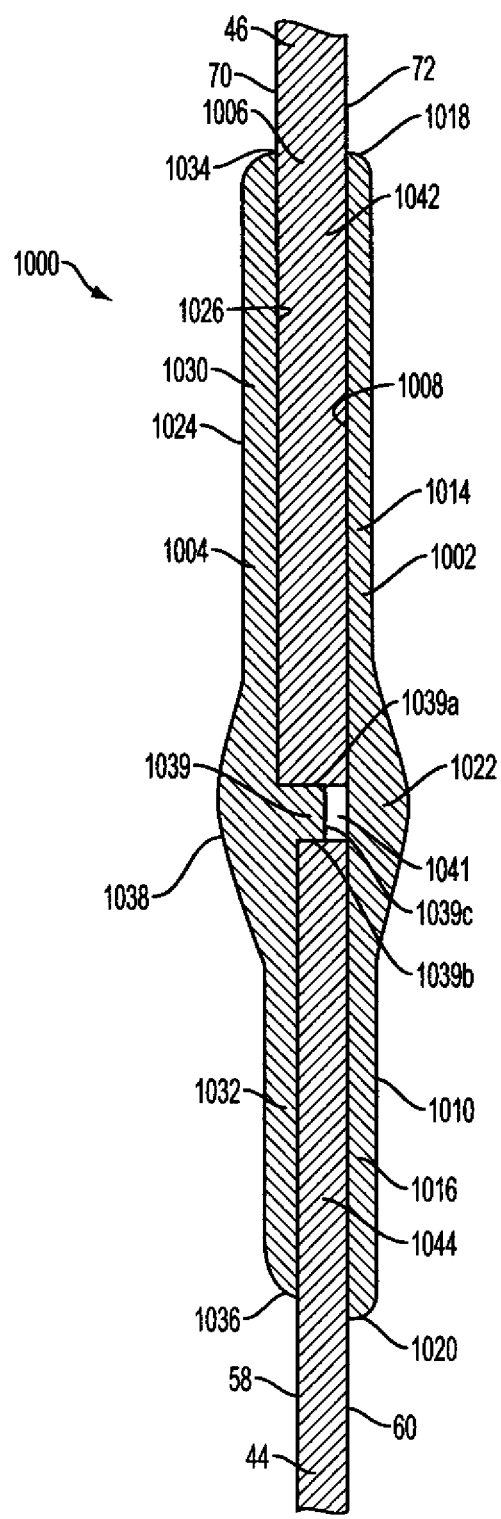
FIG. 20 is a cross-sectional view of a portion of a side wall of a trailer which incorporates the features of a tenth embodiment of the butt joint.

FIG. 19 illustrates an alternative outer member 902 which can be used in connection with the butt joint 900. As shown in FIG. 19, the outer member 902' is provided with a tongue 939'. The inner member (not shown) with which the outer member 902' is assembled is not shown but includes a corresponding notch. As also shown in FIG. 19, the outer member 902' includes an upper end 918' having a semi-annularly-shaped cross-section and a lower end 920' having a semi-circularly shaped cross-section. When the outer member 902' is positioned proximate the side panels 46, a cavity 932' is defined between the upper end 918' and the outer surfaces of the side panels 46. A sealant, such as PVC foam tape, is placed in the cavity 932' to prevent moisture from entering the trailer 30 through the butt joint 900. Furthermore, in the event fasteners are used in assembling the butt joint 900 with the panels 46 and the base rail 44, the ends 918', 920' along with the rub rails 922', 938 provide protection to the fasteners. The ends 918', 920' and the rub rails 922', 938 prevent shearing off of the fasteners in the event the trailer 30 rubs against another trailer or in the event cargo or equipment used to load cargo rubs along the interior of the trailer side wall 34. Such protection results in lower equipment maintenance cost.

FIG. 20 illustrates the butt joint 1000 of the tenth embodiment. The butt joint 1000 includes an outer member 1002 and an inner member 1004 generally spaced from the outer member 1002. A channel 1006 is provided between the outer and inner members 1002, 1004 for receiving the side panels 46 and the base rail 44. The outer member 1002 includes an inner surface 1008, an outer surface 1010 and front and rear ends (not shown). The outer member 1002 has an upper portion 1014 extending downwardly from an upper end 1018, a lower portion 1016 extending upwardly from a lower end 1020, and a rub rail 1022 between the upper and lower portions 1014, 1016. The inner surface 1008 is planar and extends from the upper end 1018 to the lower end 1020. The rub rail 1022 extends outwardly from the upper and lower portions 1014, 1016 and preferably extends continuously from the front end to the rear end. Thus the outer member 1002 of the butt joint 1000 is similar to the outer member 902 of the butt joint 900, except that the outer member 1002 does not include a notch at the inner surface 1008.

The inner member 1004 includes an inner surface 1024, an outer surface 1026 and front and rear ends (not shown). The inner member 1004 includes an upper portion 1030 extending downwardly from an upper end 1034, a lower portion 1032 extending upwardly from a lower end 1036, and a rub rail 1038 and tongue 1039 between the upper and lower portions 1030, 1032.

The inner member 1004 of the tenth embodiment is identical to the inner member 904 of the ninth embodiment with the following exception: the tongue 1039 of the inner member 1004 does not extend into the outer member 1002. The tongue 1039 is aligned with the rub rail 1038 and extends outwardly from the outer surface 1026. The tongue 1039 preferably extends continuously from the front end to the rear end. The tongue 1039 includes first, second and third surfaces 1039a, 1039b, 1039c. The first and second surfaces 1039a, 1039b are generally parallel to each other and are generally perpendicular to the outer surface 1026. The third surface 1039e is generally parallel to the outer surface 1026.

The channel 1006 is defined between the outer member 1002 and the inner member 1004 when the outer and inner members 1002, 1004 are positioned proximate one another. The tongue 1039 extends toward the inner surface 1008 of the outer member 1002 but is not seated within the outer member 1002 such that a void 1041 is provided between the surface 1039c of the tongue 1039 and the inner surface 1008 of the outer member 1002.

The channel 1006 is defined by the inner surface 1008 of the outer member 1002 and the outer surface 1026 of the inner member 1004. The channel 1006 includes an upper portion 1042 above the tongue 1039 and void 1041 and provided between the inner surface 1008 of the upper portion 1014 of the outer member 1002 and the outer surface 1026 of the upper portion 1030 of the inner member 1004, and a lower portion 1044 below the tongue 1039 and void 1041 and provided between an inner surface 1008 of the of the lower portion 1016 of the outer member 1002 and the outer surface 1026 of the lower portion 1032 of the inner member 1004. The tongue 1039 and the void 1041 divide the upper portion 1042 and the lower portion 1044 of the channel 1006. When the inner member 1004 is positioned next to the outer member 1002, the portion of the channel 1006 above the tongue 1039 and void 1041 is wider than the portion of the channel below the tongue 1039 and void 1041 due to the offset outer surface 1026 of the inner member 1004.

Assembly of the butt joint 1000 is identical to assembly of the butt joint 900 with the exception that the tongue 1039 of the inner member 1004 does not extend into a notch in the outer member 1002. Thus, the third surface 1039c of the tongue 1039 does not extend outwardly of the outer surface 60 of the base rail 44. Rather the third surface 1039c of the tongue 1039 is positioned between the upper edge of the base rail 44 and the lower edge of the side panels 46.

The butt joint 1000 has been described as including a tongue 1039 on the inner member 1004. As would be clear to one of ordinary skill in the art, the tongue 1039 could be provided on the outer member 1002. In addition, if desired, the void 1041 can be eliminated the third surface 1039c of the tongue 1039 can abut against the inner surface 1008 of the outer member 1002.

Figure 21:
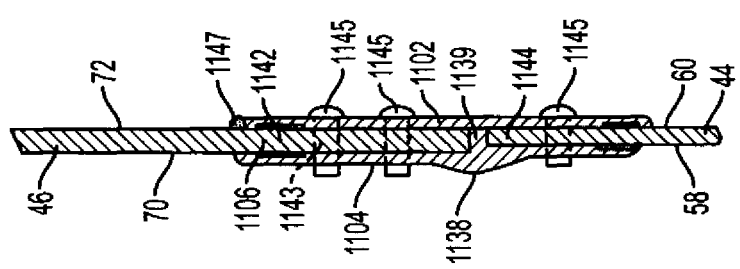
FIG. 21 is a cross-sectional view of a portion of a side wall of a trailer which incorporates the features of an eleventh embodiment of the butt joint.

FIGS. 21-25 illustrate the butt joint 1100 of the eleventh embodiment. As best shown in FIG. 21, the butt joint 1100 includes an outer member 1102 and an inner member 1104 generally spaced from the outer member 1102. A channel 1106 is provided between the outer and inner members 1102, 1104 for receiving the side panels 46 and the base rail 44.

Figure 23:
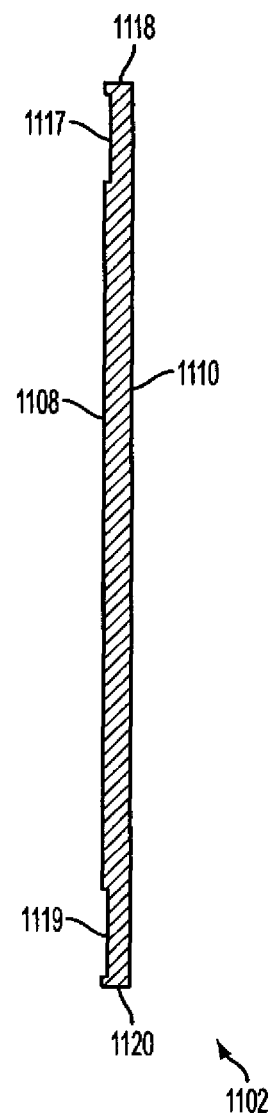
FIG. 23 is a cross-sectional view of an outer element of the eleventh embodiment of the butt joint.

As best shown in FIG. 23, the outer member 1102 includes an inner surface 1108, an outer surface 1110 and front and rear ends (not shown). The outer member 1102 has an upper end 1118 and a lower end 1120. The outer member 1102 is generally elongated with a rectangular cross-section. The inner and outer surfaces 1108, 1110 are generally planar, except an upper recess 1117 is provided at the inner surface 1108 proximate the upper end 1118 and a lower recess 1119 is provided at the inner surface 1108 proximate the lower end 1120. The upper and lower recesses 1117, 1119 preferably extend continuously from the front end to the rear end.

Figure 22:
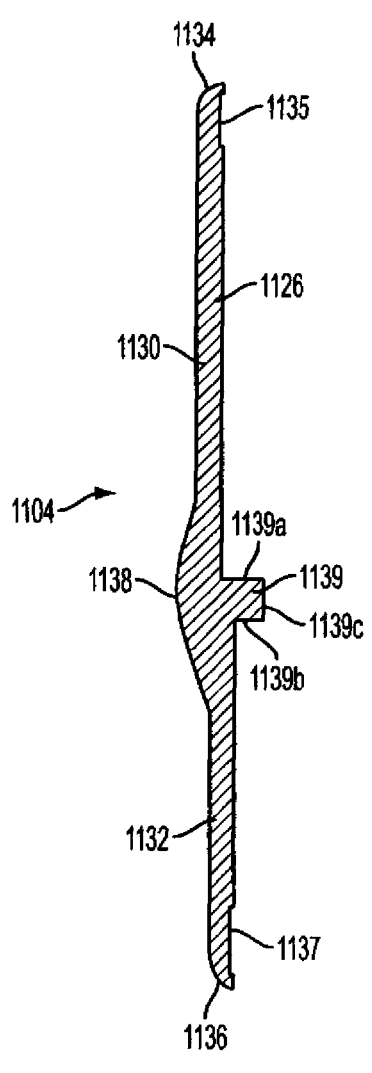
FIG. 22 is a cross-sectional view of an inner element of the eleventh embodiment of the butt joint.

As best shown in FIG. 22, the inner member 1104 includes an inner surface 1124, an outer surface 1126 and front and rear ends (not shown). The inner member 1104 includes an upper portion 1130 extending downwardly from an upper end 1134, a lower portion 1132 extending upwardly from a lower end 1136, and a rub rail 1138 and tongue 1139 between the upper and lower portions 1130, 1132. The outer surface 1126 at the upper portion 1130 is offset from the outer surface 1126 at the lower portion 1132 such that the outer surface of the upper portion 1130 is positioned inwardly of the outer surface 1126 of the lower portion 1132. The rub rail 1138 extends inwardly from the upper and lower portions 1130, 1132 and preferably extends continuously from the front end to the rear end. The rub rail 1138 provides a thickened portion of the inner member 1104, and, as shown, has a generally arc-shaped cross-section. The rub rail 1138 can take other shapes as desired. The lower portion 1132 extends from the rub rail 1138 to the lower end 1136, and from the front end to the rear end of the inner member 1104. The upper portion 1130 extends from the rub rail 1138 to the upper end 1134, and from the front end to the rear end of the inner member 1104. The tongue 1139 is generally aligned with the rub rail 1138 and extends generally outwardly from the outer surface 1126. The tongue 1139 preferably extends continuously from the front end to the rear end. The tongue 1139 includes first, second and third surface 1139a, 1139b, 1139e. The first and second surfaces 1139a, 1139b are generally parallel to each other and are generally perpendicular to the outer surface 1126. The third surface 1139c is generally parallel to the outer surface 1126. An upper recess 1135 is provided at the outer surface 1126 proximate the upper end 1134 and a lower recess 1137 is provided at the outer surface 1126 proximate the lower end 1136. The upper end 1134 includes a sloped surface which extends downwardly from the outer surface 1126 to the inner surface 1124 and the lower end 1136 includes a sloped surface which extends downwardly from the inner surface 1124 to the outer surface 1126.

As best shown in FIG. 21, the channel 1106 is defined between the outer member 1102 and the inner member 1104 when the outer and inner members 1102, 1104 are positioned proximate one another and the tongue 1139 is positioned proximate the inner surface 1108 of the outer member 1102. More specifically, the channel 1106 is defined by the inner surface 1108 of the outer member 1102 and the outer surface 1126 of the inner member 1104. The channel 1106 includes an upper portion 1142 above the tongue 1139, and a lower portion 1144 below the tongue 1139. Thus, the tongue 1139 divides the upper portion 1142 and the lower portion 1144 of the channel 1106. When the inner member 1104 is positioned next to the outer member 1102 as shown in FIG. 21, the portion of the channel 1106 above the tongue 1139 is wider than the portion of the channel below the tongue 1139 due to the offset outer surface 1126 of the inner member 1104.

Figure 25:
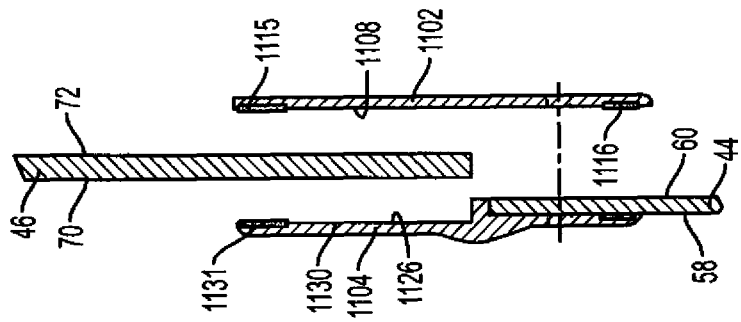
FIG. 25 is a cross-sectional view of the eleventh embodiment of the butt joint shown partially assembled with a base rail and a side panel.
Figure 24:
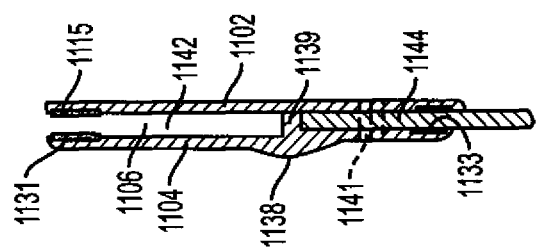
FIG. 24 is a cross-sectional view of the eleventh embodiment of the butt joint shown assembled with a base rail.

Assembly of the butt joint 1100 is illustrated in FIGS. 21, 24 and 25. Assembly of the butt joint 1100 begins by placing a sealant 1131 in the upper recess 1135, a sealant 1133 in the lower recess 1137 of the inner member 1104, and a sealant 1115 in the upper recess 1117 of the outer member 1102. The sealants 1131, 1133, 1115, 1116 can be, for example, PVC foam tape. Next, as shown in HG. 24, the outer member 1102 and the inner member 1104 are positioned proximate one another to form the channel 1106 with the base rail 44 positioned in the lower portion 1144 of the channel 1106. The base rail 44 is positioned such that the upper end of the base rail 44 is proximate the surface 1139b of the tongue 1139 of the inner member 1104. Then, a lower row of apertures extending from the front ends of the outer and inner members 1102, 1104 to the rear ends of the outer and inner members 1102, 1104 is stack punched, such that the apertures 1141 extend through the outer member 1102, the base rail 44 and the inner member 1104. The lower row of apertures 1141 is provided between the tongue 1139 and the lower end 1136. Next, removable fasteners are installed in a plurality of the apertures 1141 of the lower row of apertures.

After installing the removable fasteners, the fasteners are then loosened to open the butt joint 1100 as shown in FIG. 25. With the butt joint 1100 open, the side panel 46 is positioned within the upper portion 1142 of the channel 1106. The side panel 46 is positioned such that the lower end of the side panel 46 is proximate the surface 1139a of the tongue 1139. A sealant 1116 is placed in the lower recess 1119 of the outer member 1102.

Next, the butt joint 1100 is pulled together with bar clamps (not shown), to the position shown in FIG. 21. Two upper rows of apertures 1143 are then stack drilled in the upper portion of the butt joint 1100. The upper rows of apertures extend from the front ends of the outer and inner members 1102, 1104 to the rear ends of the outer and inner members 1102, 1104. The upper rows of apertures 1143 are provided between the tongue 1139 and the upper end 1134. Fasteners, such as rivets 1145, are then set in the upper and lower rows of apertures to secure the butt joint 1100. Finally, a continuous bead of caulk 1147 is provided between the upper end 1118 of the outer member 1102 and the outer surface 72 of the side panel 46.

As shown in FIG. 21, with the butt joint 1100 assembled, the side panels 46 are positioned in the upper portion 1142 of the channel 1106 above the tongue 1139 and the base rail 44 is positioned in the lower portion 1144 of the channel 1106 below the tongue 1139. The outer surfaces 72 of the side panels 46 abut the inner surface 1108 of the outer member 1102, and the inner surfaces 70 of the side panels 46 abut the outer surface 1126 of the upper portion 1130 of the inner member 1104. The outer surface 60 of the base rail 44 abuts the inner surface 1108 of the outer member 1102 and the inner surface 58 of the base rail 44 abuts the outer surface 1126 of the lower portion 1132 of the inner member 1104. In addition, the surface 1139e of the tongue 1139 of the inner member 1104 extends proximate the inner surface 1108 of the outer member 1102. Further, the butt joint 1100 provides that the outer surface 72 of the side panel 46 is planar with the outer surface 60 of the base rail 44.

The width of the side panel 46 is greater that the width of the base rail 44. The upper portion 1142 of the channel 1106 is therefore wider than the lower portion 1144 of the channel 1106 to accommodate the side panels 46 which have a greater width than the base rail 44. As with previous embodiments, by removing the offset as found in the prior art, see FIG. 1, and providing vertical alignment of the outer surfaces 60, 72 of the base rail 44 and the side panels 46, a bending moment exerted to the butt joint 1100 during operation of the trailer 30 is minimized. In addition, the outer and inner members 1102, 1104 act as structural members of the side wall 34 capable of carrying shear and bending forces. Thus, the structural integrity of the side wall 34 is improved by the butt joint 1100. Furthermore, the butt joint 1100 provides for an improved load capacity and improved floor strength capacity. The butt joint 1100 also provides for simplified assembly of the trailer 30, lowers the tare weight of the trailer 30 and lowers the manufacturing costs.

The rub rail 1138 of the inner member 1104 carries vertical compressive forces acting on the butt joint 1100 and prevents the inner member 1104 from deforming as a result of such forces. The rub rail 1138 prevent shearing off of the fasteners in the event cargo or equipment used to load cargo rubs along the interior of the trailer side wall 34. Such protection results in lower equipment maintenance cost.

The butt joint 1100 has been described as including a tongue 1139 on the inner member 1104. As would be clear to one of ordinary skill in the art, the tongue 1139 could be provided on the outer member 1102.

FIGS. 26 and 27 illustrate the butt joint 1200 of the twelfth embodiment. The butt joint 1200 includes an outer member 1202 and an inner member 1204 generally spaced from the outer member 1202. A channel 1206 is provided between the outer and inner members 1202, 1204 for receiving the side panels 46 and the base rail 44.

The outer member 1202 includes an inner surface 1208, an outer surface 1210 and front and rear ends (not shown). The outer member 1202 has an upper end 1218 and a lower end 1220. The ends 1218, 1220 protrude outwardly from the remainder of the outer surface 1210 of the outer member 1202 to prevent the heads of rivets installed in the side wall from shearing off if the side wall is contacted by an outside member, such as another trailer. The outer member 1202 is generally elongated with a rectangular cross-section. The inner and outer surfaces 1208, 1210 are generally planar, except an upper recess 1217 is provided at the inner surface 1208 proximate the upper end 1218 and a lower recess 1219 is provided at the inner surface 1208 proximate the lower end 1220. The upper and lower recesses 1217, 1219 preferably extend continuously from the front end to the rear end.

The inner member 1204 includes an inner surface 1224, an outer surface 1226, and front and rear ends. The inner member 1204 includes an upper portion 1230 extending downwardly from an upper end 1234, a lower portion 1232 extending upwardly from a lower end 1236, and a rub rail 1238 and tongue 1239 between the upper and lower portions 1230, 1232. The outer surface 1226 at the upper portion 1230 is offset from the outer surface 1226 at the lower portion 1232 such that the outer surface of the upper portion 1230 is positioned inwardly of the outer surface 1226 of the lower portion 1232.

The rub rail 1238 extends inwardly from the upper and lower portions 1230, 1232 and preferably extends continuously from the front end to the rear end. The rub rail 1238 provides a thickened portion of the inner member 1204, and, as shown, has a generally arc-shaped cross-section. The rub rail 1238 can take other shapes as desired. The lower portion 1232 extends from the rub rail 1238 to the lower end 1236, and from the front end to the rear end of the inner member 1204. The upper portion 1230 extends from the rub rail 1238 to the upper end 1234, and from the front end to the rear end of the inner member 1204.

The tongue 1239 is generally aligned with the rub rail 1238 and extends generally outwardly from the outer surface 1226. The tongue 1239 preferably extends continuously from the front end to the rear end. The tongue 1239 includes first, second and third surfaces 1239a, 1239b, 1239c. The first and second surfaces 1239a, 1239b are generally parallel to each other and are generally perpendicular to the outer surface 1226. The third surface 1239c is generally parallel to the outer surface 1226. An upper recess 1235 is provided at the outer surface 1226 proximate the upper end 1234 and a lower recess 1237 is provided at the outer surface 1226 below the tongue 1239 and spaced from the lower end 1236. The upper end 1234 includes a sloped surface which extends downwardly from the outer surface 1226 to the inner surface 1224 and the lower end 1236 includes a sloped surface which extends downwardly from the inner surface 1224 to the outer surface 1226.

As best shown in FIG. 26, the channel 1206 is defined between the outer member 1202 and the inner member 1204 when the outer and inner members 1202, 1204 are positioned proximate one another and the tongue 1239 is positioned proximate the inner surface 1208 of the outer member 1202. More specifically, the channel 1206 is defined by the inner surface 1208 of the outer member 1202 and the outer surface 1226 of the inner member 1204. The channel 1206 includes an upper portion 1242 above the tongue 1239, and a lower portion 1244 below the tongue 1239. Thus, the tongue 1239 divides the upper portion 1242 and the lower portion 1244 of the channel 1206. When the inner member 1204 is positioned next to the outer member 1202, the portion of the channel 1206 above the tongue 1239 is wider than the portion of the channel below the tongue 1239 due to the offset outer surface 1226 of the inner member 1204.

Assembly of the butt joint 1200 is conducted in the same manner as assembly of the butt joint 1100 described above. Assembly of the butt joint 1200 begins by placing a sealant in the upper recess 1217, the lower recess 1219, the upper recess 1235 and the lower recess 1237. The sealants can be, for example, PVC foam tape.

The outer member 1202 and the inner member 1204 are then positioned proximate one another to form the channel 1206. The base rail 44 is then positioned in the lower portion 1244 of the channel 1206. The base rail 44 is positioned such that the upper end of the base rail 44 is proximate the second surface 1239b of the tongue 1239

Next, a lower row of apertures 1241 extending from the front ends of the outer and inner members 1202, 1204 to the rear ends of the outer and inner members 1202, 1204 is stack punched, such that the apertures 1241 extend through the outer member 1202, the base rail 44 and the inner member 1204. The lower row of apertures 1241 is provided between the tongue 1239 and the lower end 1236. Next, removable fasteners are installed in a plurality of the apertures 1241.

After installing the removable fasteners, the removable fasteners are then loosened to open the butt joint 1200. With the butt joint 1200 open, the side panel 46 is positioned within the upper portion 1242 of the channel 1206. The side panel 46 is positioned such that the lower end of the side panel 46 is proximate the surface 1239a of the tongue 1239.

Next, the butt joint 1200 is pulled together with bar clamps (not shown). Two upper rows of apertures 1243 are then stack drilled in the upper portion of the butt joint 1200. The upper rows of apertures 1243 extend from the front ends of the outer and inner members 1202, 1204 to the rear ends of the outer and inner members 1202, 1204. The upper rows of apertures 1243 are provided between the tongue 1239 and the upper end 1234. Fasteners, such as rivets 1245, are then set in the upper and lower rows of apertures to secure the butt joint 1200. Finally, a continuous bead of caulk 1247 is provided between the upper end 1218 of the outer member 1202 and the outer surface 72 of the side panel 46.

With the butt joint 1200 fully assembled, the side panels 46 are positioned in the upper portion 1242 of the channel 1206 above the tongue 1239 and the base rail 44 is positioned in the lower portion 1244 of the channel 1206 below the tongue 1239. The outer surfaces 72 of the side panels 46 abut the inner surface 1208 of the outer member 1202, and the inner surfaces 70 of the side panels 46 abut the outer surface 1226 of the upper portion 1230 of the inner member 1204. The outer surface 60 of the base rail 44 abuts the inner surface 1208 of the outer member 1202 and the inner surface 58 of the base rail 44 abuts the outer surface 1226 of the lower portion 1232 of the inner member 1204. In addition, the third surface 1239c of the tongue 1239 of the inner member 1204 extends proximate the inner surface 1208 of the outer member 1202. Further, the butt joint 1200 provides that the outer surface 72 of the side panel 46 is planar with the outer surface 60 of the base rail 44.

The width of the side panel 46 is greater that the width of the base rail 44. The upper portion 1242 of the channel 1206 is therefore wider than the lower portion 1244 of the channel 1206 to accommodate the side panels 46 which have a greater width than the base rail 44. As with previous embodiments, by removing the offset as found in the prior art, see FIG. 1, and providing vertical alignment of the outer surfaces 60, 72 of the base rail 44 and the side panels 46, a bending moment exerted to the butt joint 1200 during operation of the trailer 30 is minimized. In addition, the outer and inner members 1202, 1204 act as structural members of the side wall 34 capable of carrying shear and bending forces. Thus, the structural integrity of the side wall 34 is improved by the butt joint 1200. Furthermore, the butt joint 1200 provides for an improved load capacity and improved floor strength capacity. The butt joint 1200 also provides for simplified assembly of the trailer 30, lowers the tare weight of the trailer 30 and lowers the manufacturing costs.

The rub rail 1238 of the inner member 1204 carries vertical compressive forces acting on the butt joint 1200 and prevents the inner member 1204 from deforming as a result of such forces. The rub rail 1238 prevent shearing off of the fasteners in the event cargo or equipment used to load cargo rubs along the interior of the trailer side wall 34. Such protection results in lower equipment maintenance cost.

The butt joint 1200 has been described as including a tongue 1239 on the inner member 1204. As would be clear to one of ordinary skill in the art, the tongue 1239 could be provided on the outer member 1202.

It is to be understood that the width of the side panel 46 can be greater, less than, or equal to the width of the base rail 44. The size of the upper and lower portions of the channel are adjusted accordingly. In each instance, however, vertical alignment of the outer surfaces 60, 72 of the base rail 44 and the side panels 46 is provided, thereby minimizing the bending moment exerted to the butt joint during operation of the trailer 30.

In each embodiment, instead of using fasteners in apertures, it is to be understood that the butt joint can be formed without the fasteners, and instead by only using adhesives. If only adhesives are used to secure the inner and outer members to the base rail 44 and the side panels 46, or the outer member to the side panel 46 and to the base rail 44 which forms the inner member, then apertures are not provided. If adhesive is used, the adhesive is provided along the entire mating surface of one of the components on each side of the side panel 46. When sandwiched together, the adhesive bonds the components together and cures. Alternatively, in any embodiment, a fasteners and adhesives could be used to secure the outer and inner members to the side panels and base rail.

Sealants can be used in any of the embodiments between the inner member and the base rail 44/side panels 46 and between the outer member and the base rail 44/side panels 46. The sealant prevents moisture from entering the trailer 30 through the butt joint. For example, the sealant can be PVC foam tape. Where such a sealant is used, the sealant is continuous from the front of the trailer 30 to the rear of the trailer 30 to prevent moisture incursion into the trailer 30.

In each embodiment where a rub rail is provided, the rub rail carries vertical compressive forces acting on the butt joint and prevents the member on which the rub rail is formed from deforming as a result of such forces. The rub rails) prevent shearing off of the fasteners in the event cargo or equipment used to load cargo rubs along the interior of the trailer side wall 34. Such protection results in lower equipment maintenance cost.

In any of the embodiments of the butt joint which have been described as including a tongue on the inner member, it would be clear to one of ordinary skill in the art, that the tongue could be provided on the outer member. In any of the embodiments of the butt joint which have been described as including a tongue on the inner member and a notch on the outer member, it would be clear to one of ordinary skill in the art, that the tongue could be provided on the outer member and the notch on the inner member.

While preferred embodiments of the present invention are shown and described, it is envisioned that those skilled in the art may devise various modifications of the present invention without departing from the spirit and scope of the appended claims.

The invention claimed is:

1. A sidewall of a trailer comprising:
   top and bottom rails;
   a side panel having outer and inner surfaces, said side panel extending downwardly from said top rail;
   a base rail having outer and inner surfaces, said base rail extending upwardly from said bottom rail;
   an inner member having an inner surface and an outer surface, said inner member is spaced from said top and bottom rails, said inner member abutting said inner surfaces of said side panel and said base rail;
   an outer member spaced from said inner member, said outer member having a generally planar inner surface and an outer surface, said outer member is spaced from said top and bottom rails, said outer member abutting said outer surfaces of said side panel and said base rail such that said outer member is spaced from said inner member to provide a channel between said inner and outer members;
   said side panel, said base rail, said inner member and said outer member being separate components; and
   one of said inner and outer members including a tongue extending therefrom, said tongue extending into and, at least partially across said channel such that an upper portion of said channel is provided above said tongue and receives said side panel and a lower portion of said channel is provided beneath said tongue and receives said base rail, said outer surfaces of said base rail and said side panel being in vertical alignment,
   wherein said outer surface of one of said inner and outer members includes an upper portion above said tongue and a lower portion below said tongue, said upper portion of said outer surface of said one of said inner and outer members offset from said lower portion of said outer surface of said one of said inner and outer members.

2. A side wall as defined in claim 1, wherein the opposite of said inner or outer member having said tongue includes a notch to receive said tongue.

3. A side wall as defined in claim 1, wherein a void is provided between an end of said tongue and said opposite inner or outer member.

4. A side wall as defined in claim 1, wherein said one of said members includes a rub rail.

5. A side wall as defined in claim 4, wherein a cavity is provided in an upper end of at least one of said inner and outer members.

6. A side wall as defined in claim 1, wherein said inner and outer members are secured to said side panel and said base rail by adhesive.

7. A side wall as defined in claim 1, wherein said inner and outer members are secured to said side panel and said base rail by fasteners.

8. A side wall as defined in claim 1, further including a sealant provided between said inner member and said side panel, between said inner member and said base rail, between said outer member and said side panel, and between said outer member and said base rail.

9. A side wall as defined in claim 8, wherein said sealant is PVC foam tape.

10. A side wall as defined in claim 8, wherein said inner and outer members include recesses therein, said sealant being provided in said recesses.

11. A sidewall of a trailer comprising:
top and bottom rails;
a side panel having outer and inner surfaces, said side panel extending downwardly from said top rail;
a base rail having outer and inner surfaces, said base rail extending upwardly from said bottom rail;
an inner member having an inner surface and an outer surface, said inner member is spaced from said top and bottom rails, said inner member abutting said inner surfaces of said side panel and said base rail;
an outer member spaced from said inner member, said outer member having a generally planar inner surface and an outer surface, said outer member is spaced from said top and bottom rails, said outer member abutting said outer surfaces of said side panel and said base rail such that said outer member is spaced from said inner member to provide a channel between said inner and outer members;
said side panel, said base rail, said inner member and said outer member being separate components; and
one of said inner and outer members including a tongue extending therefrom, said tongue extending into and, at least partially across said channel such that an upper portion of said channel is provided above said tongue and receives said side panel and a lower portion of said channel is provided beneath said tongue and receives said base rail, said outer surfaces of said base rail and said side panel being in vertical alignment, wherein a width of said upper portion of said channel is different than a width of said lower portion of said channel.

12. A side wall as defined in claim 11, wherein said one of said members includes a rub rail.

13. A side wall as defined in claim 12, wherein a cavity is provided in an upper end of at least one of said inner and outer members.

14. A side wall as defined in claim 11, wherein said inner and outer members are secured to said side panel and said base rail by adhesive.

15. A side wall as defined in claim 11, wherein said inner and outer members are secured to said side panel and said base rail by fasteners.

16. A side wall as defined in claim 11, further including a sealant provided between said inner member and said side panel, between said inner member and said base rail, between said outer member and said side panel, and between said outer member and said base rail.

17. A side wall as defined in claim 16, wherein said inner and outer members include recesses therein, said sealant being provided in said recesses.

18. A sidewall of a trailer comprising:
top and bottom rails;
a side panel having outer and inner surfaces and defining a first thickness between said outer and inner surfaces, said side panel extending downwardly from said top rail;
a base rail having outer and inner surfaces and defining a second thickness between said outer and inner surfaces of said base rail, said second thickness different from said first thickness, said base rail extending upwardly from said bottom rail;
an inner member spaced apart from said top and bottom rails, said inner member having an inner surface abutting said inner surfaces of each of said side panel and said base rail; and
an outer member spaced from said top and bottom rails and having a generally planar inner surface, said inner surface of said outer member abutting said outer surfaces of each of said side panel and said base rail such that said outer member is spaced from said inner member to define a channel between said inner surfaces of said inner and outer members;
one of said inner and outer members including a tongue extending therefrom, said tongue extending into and, at least partially across said channel such that an upper portion of said channel is defined above said tongue and a lower portion of said channel is defined below said tongue, said upper portion of said channel sized to receive therein said first thickness of said side panel and said lower portion of said channel sized to receive therein said second thickness of said base rail with said outer surfaces of said base rail and said side panel vertically aligned by said planar inner surface of said outer member.

* * * * *